United States Patent [19]

Patel

[11] 4,410,923

[45] Oct. 18, 1983

[54] DISPLAY APPARATUS FOR RECORDING AND/OR PLAYBACK DEVICE

[75] Inventor: Pankaj R. Patel, Norwalk, Conn.

[73] Assignee: Dictaphone Corporation, Rye, N.Y.

[21] Appl. No.: 223,718

[22] Filed: Jan. 9, 1981

[51] Int. Cl.³ ............... G11B 17/00; G11B 15/18; G11B 19/02; G11B 21/12

[52] U.S. Cl. ............... 360/137; 360/72.1; 360/72.3; 369/27

[58] Field of Search ............... 360/72.3, 72.1, 137; 369/27, 28

[56] References Cited

U.S. PATENT DOCUMENTS

| | | |
|---|---|---|
| 2,161,273 | 6/1937 | Begun . |
| 2,306,614 | 12/1942 | Clausen . |
| 2,329,107 | 9/1943 | Clausen . |
| 2,610,061 | 9/1952 | Kegan . |
| 2,866,855 | 12/1958 | La Forest . |
| 2,874,219 | 2/1959 | Cavanaugh . |
| 3,171,902 | 3/1965 | Jones et al. . |
| 3,203,000 | 8/1965 | Dollenmayer . |
| 3,405,234 | 10/1968 | West . |
| 3,470,777 | 10/1969 | Flubacker . |
| 3,541,271 | 11/1970 | Joslow et al. . |
| 3,623,039 | 11/1971 | Barham . |
| 3,671,683 | 6/1972 | Rahenkamp et al. . |
| 3,760,124 | 9/1973 | Gaven . |
| 3,797,037 | 3/1974 | Kolpek . |
| 3,800,313 | 3/1974 | Karklys . |
| 3,827,079 | 7/1974 | Bolick . |
| 3,829,898 | 8/1974 | Jager . |
| 4,007,491 | 2/1977 | Bolick . |
| 4,051,540 | 9/1977 | Wilder . |
| 4,095,732 | 6/1978 | Merritt ............... 360/72.3 |
| 4,200,893 | 4/1980 | Matison . |
| 4,352,173 | 9/1982 | Titus ............... 369/27 |

FOREIGN PATENT DOCUMENTS 2816732 12/1979 Fed. Rep. of Germany .

OTHER PUBLICATIONS

"Popular Electronics", Oct. 1975, pp. 69–70.

Primary Examiner—Robert M. Kilgore
Attorney, Agent, or Firm—Curtis, Morris & Safford

[57] ABSTRACT

Display apparatus is provided for a recording and/or playback device of the type having a movable record medium upon which cue signals may be recorded to indicate an end of "letter", an "instruction" or the like. A linear array of light indicating elements is selectively energized to provide a cursor indication of the present position of the record medium as it is moved relative to a reference position. Selected ones of these elements also are energized in response to the recording or playback of a cue signal to indicate the relative locations of the cue signals on the record medium. In one embodiment, a numerical display also is provided to indicate a time-related quantity of record medium which has been transported during a recording or playback operation. If the record medium is, for example, a magnetic tape transported from a supply reel to a take-up reel, motion pulses are generated as the tape is transported. Although the frequency of such motion pulses changes as the quantity of tape remaining on the supply reel changes, such pulses are counted in a "linearized" manner such that the numerical display is a linear representation of time that has been either consumed or that remains available for further use. In a preferred embodiment, prior to carrying out a transcribe operation, the recording medium is scanned to ascertain the presence of cue signals thereon; and appropriate ones of the light indicating elements are energized such that, at the completion of the scanning operation, the relative locations of the previously recorded cue signals are displayed. Preferably, during a transcribe operation, the numerical display indicates the quantity of time remaining between the cursor position and the immediately-following cue signal location.

47 Claims, 21 Drawing Figures

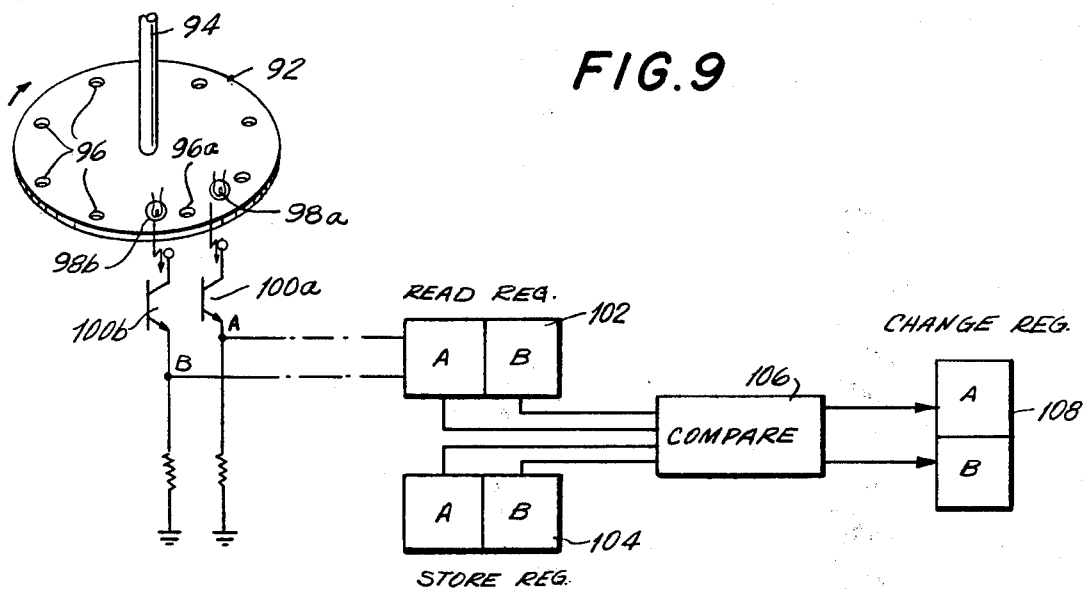
FIG. 9
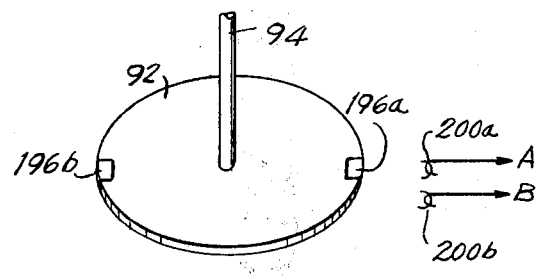
FIG. 9A
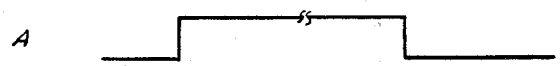
FIG. 10A
FIG. 10B
FIG. 10C
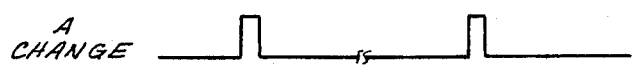
FIG. 10D
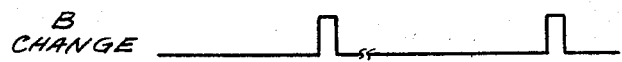
FIG. 10E

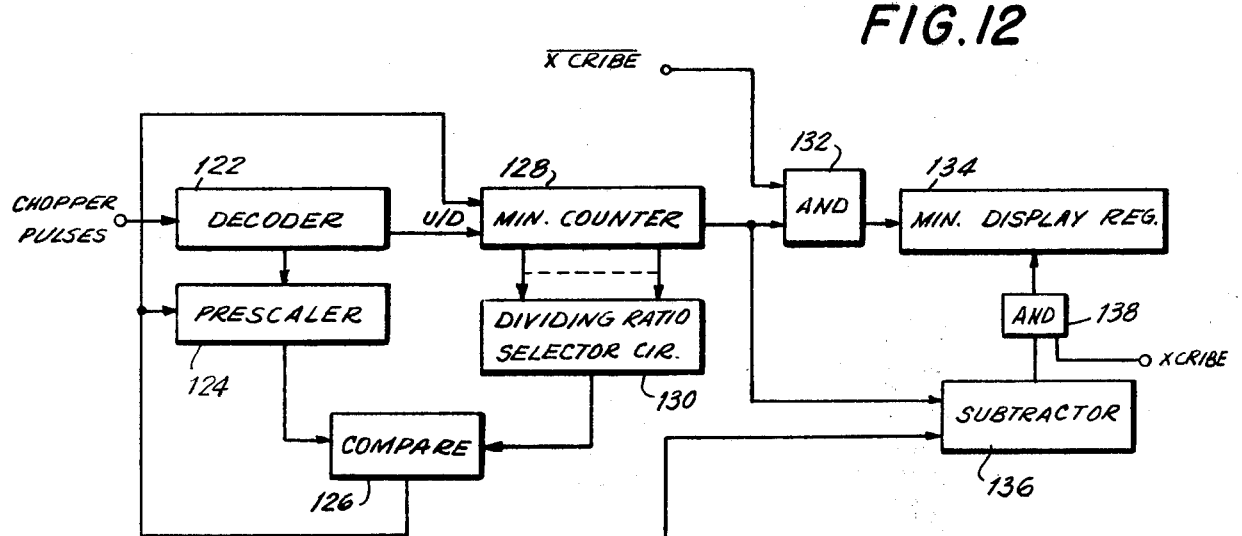
FIG.12
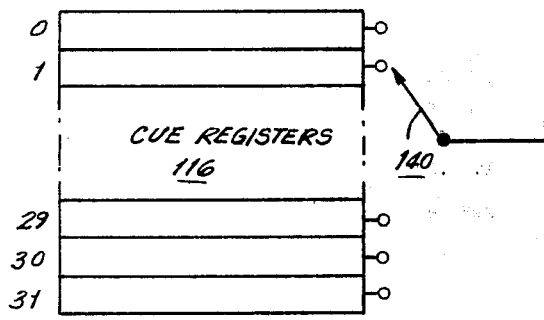
FIG.14
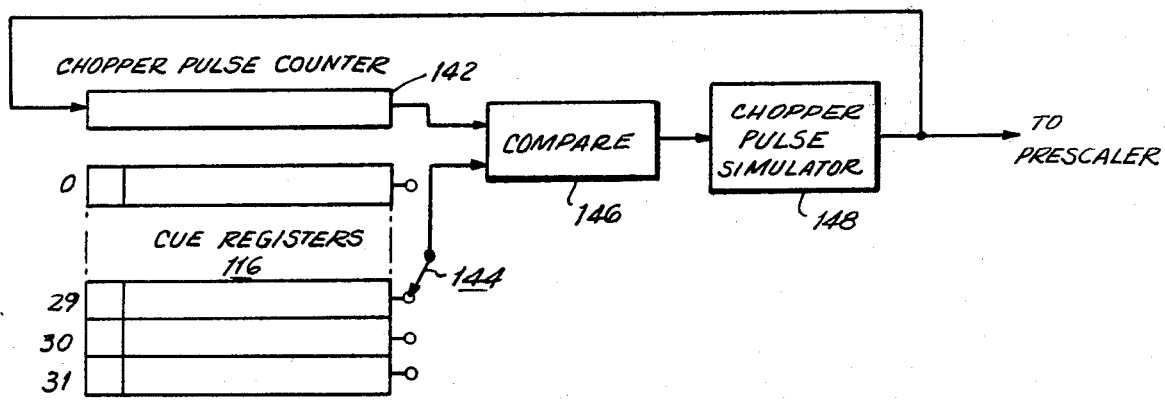

DISPLAY APPARATUS FOR RECORDING AND/OR PLAYBACK DEVICE

BACKGROUND OF THE INVENTION

This invention relates to display apparatus for use in a recording/playback device and, more particularly, to such apparatus for providing a cursor display as well as a display of the relative locations of cue signals recorded on the record medium with which the device operates.

In recording/playback devices that are particularly useful for the recording of dictated information and for the transcribing of same, it is advantageous to provide an indication of the present position of the record medium, relative to a reference location, and also to provide indications of the relative locations of signals representing the ends of "letters", or the locations of "instructions" and the like. Typically, an indication of the present position of the record medium has been provided, in accordance with prior art devices, by a mechanical pointing arrangement which is driven in synchronism with the record medium and which includes a mechanical indicator that scans an index scale. The index scale generally includes demarcations representing time-related quantities, such as minutes, and the relative location of the indicator designates the amount of record medium which has been consumed or which remains available.

In such dictation equipment, the index scale typically is a paper strip which is marked to indicate the ends of letters or the locations of special instructions which may be dictated by the user. Suitable solenoid-activated scribing instruments, heater elements, or the like are employed to be triggered by remotely controlled switches, usually provided on the dictation handset, to provide such marks.

These prior art arrangements, although satisfactory to carry out their intended purpose, suffer from various disadvantages. For example, the construction and assembly of a mechanical pointing arrangement is quite expensive and time-consuming. It is preferred, therefore, to replace this mechanical pointing arrangement with an electronic cursor indication.

Another disadvantage is that the use of a marked slip generally must accompany the dictated record medium and must be disposed in a compatible transcribing machine to enable the transcriptionist to observe the relative locations of "letter" and "instruction" marks. Of course, this information is lost if the marked index slip is misplaced or otherwise becomes separated from the dictated record medium. Furthermore, a separate index slip must be prepared by the user for each new record medium (e.g. each magnetic tape cassette, magnetic belt, magnetic disc, or the like) that he uses.

The aforenoted disadvantages have been overcome by the introduction of so-called electronic indicators which provide suitable displays of "instruction" marks. One type of electronic indicating system is disclosed in U.S. Pat. No. 4,051,540. In the patented system, an array of light indicating elements, such as light emitting diodes (LED's), liquid crystal devices (LCD's) or the like are selectively energized to provide visual indications of the locations of instruction signals recorded on the record medium. A so-called cue signal is recorded on the medium by the user of the apparatus to indicate the location of a particular instruction. In addition to recording the cue signal, the light indicating element which corresponds to the present position of the record medium is energized. Thus, the user is provided with a display of the locations of his recorded instructions. Prior to transcribing the dictated information, a transcribing machine is operated in a so-called "scan" mode, whereby each recorded cue signal is detected, and the relative location of that cue signal is indicated by energizing a corresponding light indicating element on the transcribing machine. However, in this patented system, a mechanical pointing arrangement is used to provide an indication of present position along the record medium.

An improved display apparatus is disclosed in U.S. Pat. No. 4,200,893. In this improved system, a microprocessor is used to control an array of light indicating elements to provide, in addition to "letter" or "instruction" displays, a cursor indication of the present position of the record medium. Thus, the mechanical pointing arrangement has been replaced by an electronic display arrangement.

In the electronic display arrangement described in the aforementioned patent, each light indicating element is associated with a time-related quantity. For example, each element is associated with a "minute" of recording time. A representation of recording time is provided by generating pulses in synchronism with the movement of the record medium. Such pulses are counted, and the count is used as a representation of recording time. However, and as mentioned above, if the record medium is a magnetic tape transported between a supply reel and a take-up reel, then the rate at which such pulses are generated varies as a function of the amount of tape remaining on the supply reel. Thus, a non-linear relationship exists between the count and the quantity of tape which has been transported (or which is available for use). To account for this non-linear relationship, the spacing between adjacent light indicating elements varies in a non-linear manner. For example, the spacing between adjacent elements in the range of 0 to 5 minutes is almost twice the spacing between adjacent elements in the range 25 to 30 minutes.

It is desirable to provide an array of light indicating elements which exhibit uniform spacing throughout the entire range. For such uniformly spaced elements to provide an accurate time-related indication of the quantity of record medium which has been consumed or which is available for use, the pulses which are generated in synchronism with the movement of the medium should be counted in a linear manner.

OBJECTS OF THE INVENTION

Therefore, it is an object of the present invention to provide display apparatus for use in a record and/or playback device which avoides the aforenoted disadvantages of the prior art.

Another object of this invention is to provide an improved display apparatus for use in a record and/or playback device which avoids the aforenoted disadrelative locations of cue signals on the record medium, as well as a cursor indication of the present position of that record medium, are used.

A further object of this invention is to provide an electronic display for use with a record and/or playback device, having separate indications for the locations of "letter" and "instruction" signals which are recorded on the record medium.

An additional object of this invention is to provide an electronic display comprised of a linear array of light indicating elements which are uniformly spaced and which are selectively energized to provide indications of the locations of cue signals recorded on a record medium, as well as a cursor indication for that medium.

Yet another object of this invention is to provide an electronic numerical display for indicating a numerical time-related quantity of the amount of record medium which has been used or which is available for use.

A still further object of this invention is to provide an electronic display of the aforementioned type which is adapted for use in a transcribing machine, and wherein the numerical display provides an indication of the amount of record medium which remains between the present position thereof and the location of the next-following cue signal thereon.

Various other objects, advantages and features of the present invention will become readily apparent from the ensuing detailed description, and the novel features will be particularly pointed out in the appended claims.

SUMMARY OF THE INVENTION

In accordance with this invention, an electronic display is provided for use in a record and/or playback device, for indicating the relative locations of cue signals recorded on the record medium used with that device, and also for providing a cursor indication of the present position of that record medium. In accordance with one embodiment of this invention, the electronic display further provides a numerical indication of the quantity of record medium which has been consumed, in terms of time, or the quantity of record medium which remains until the end of a dictated message. In accordance with another embodiment, the display is comprised of a linear array of light indicating elements, such as LED's, LCD's, or the like, which are uniformly spaced and which are associated with respective increments of time. Accordingly, if the record medium is a magnetic tape transported between supply and take-up reels, a linear display is provided regardless of the amount of tape which remains on the supply reel. In accordance with a still further embodiment, a record medium having various cue signals recorded thereon is scanned prior to carrying out a transcribing operation, resulting in a display of the relative locations of recorded cue signals upon the completion of the scanning operation. Thus, at the completion of the scanning operation, a transcriptionist is provided with a display whereby the preparation and setting up of the transcribe operation is facilitated.

BRIEF DESCRIPTION OF THE DRAWINGS

The following detailed description, given by way of example, will best be understood in conjunction with the accompanying drawings in which:

FIG. 9 is a block diagram representing the manner in which movement of the record medium is detected;

FIGS. 10A–10E are timing diagrams which are useful in understanding the operation of FIG. 9;

FIG. 12 is a block diagram of apparatus which can be used to control the display during a record or transcribe mode of operation;

FIG. 14 is a block diagram which is useful in understanding the manner in which a display-adjustment operation is carried out at the completion of a scan mode.

DETAILED DESCRIPTION OF A PREFERRED EMBODIMENT

Figure 1:
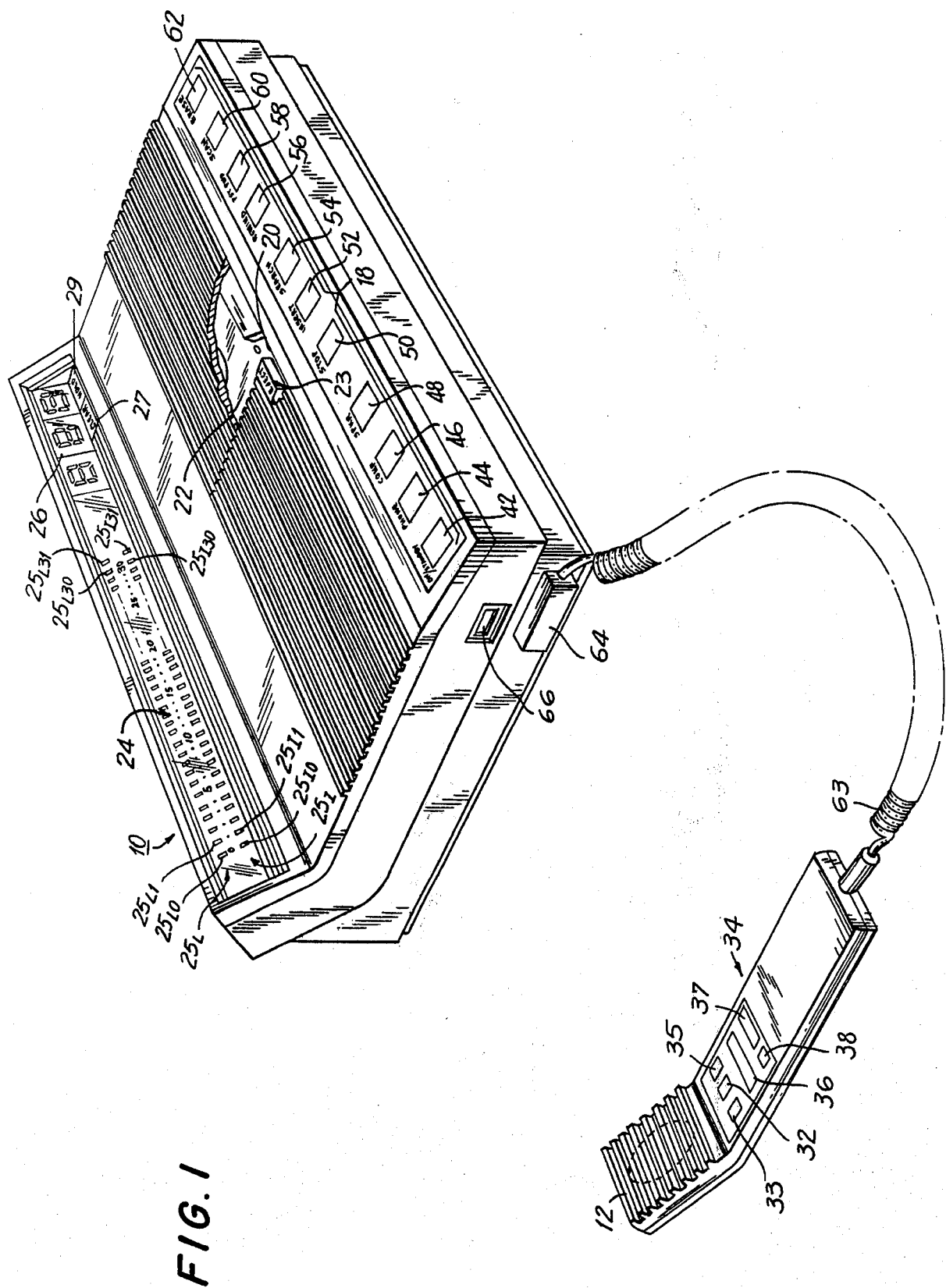
FIG. 1 is an overall view of one type of record/playback machine with which the present invention can be used.

Referring now to the drawings, and in particular to FIG. 1, there is illustrated a representation of a recording/playback device 10, adapted to function as a dictation/transcription machine with which the present invention finds ready application. This machine includes magnetic transducers, or heads, which are selectively controlled to operate as recording transducers for the recording of audio signals onto a magnetic record medium, such as magnetic tape, and also to reproduce such information. Suitable audio amplifiers, filters and other circuits are provided for the recording and reproduction of such signals. Also included in machine 10 is a so-called slow motor which is selectively energized to transport the magnetic tape at a normal speed at which the audio signals are recorded on and reproduced from that magnetic tape, and a so-called fast motor which is selectively energized to drive the magnetic tape at a relatively high speed in either the forward or reverse directions. A transmission (not shown) is provided such that the single fast speed motor imparts rotary motion in the forward or reverse directions in accordance with the selective actuation of a fast-forward or rewind selector, to be described. Recording, playback, fast-forward and rewind operations are conventional and well known to those of ordinary skill in the art.

Preferably, the magnetic tape upon which the audio signals are recorded is contained within a tape cassette 22 disposed within a suitable cassette compartment 20 of machine 10. An EJECT button 23 is provided to expose cassette compartment 20 so as to load cassette 22 therein or to remove the cassette therefrom. Machine 10 is electrically connected to a handheld microphone unit 12, whereby voice signals are supplied to the recording circuit of the machine from the microphone unit. The microphone unit also is provided with a loudspeaker such that signals which are reproduced from the magnetic tape are transduced selectively either by the loudspeaker integrally provided in machine 10 or by the loudspeaker integrally provided with microphone unit 12. As will be described, a suitable speaker control switch is provided on machine 10 to select either the machine speaker or the microphone speaker for transducing of the reproduced signals.

Microphone unit 12 also is provided with various control switches 34 which are manually operable to select various operating modes for machine 10. These control switches include a record-lock switch 32 which, when operated, selects and latches a recording mode for machine 10. In this mode of operation, the magnetic tape included within cassette 22 is driven at its normal speed, and the recording circuit is energized so as to record audio signals on the magnetic tape. These audio signals are, of course, produced by the microphone pick-up (not shown) which is provided in unit 12. This unit also includes a cue signal recording switch 33 which, when operated, initiates a cue signal generating-/recording mode whereby a cue signal is recorded on the magnetic tape. Preferably, this cue signal is recorded in the very same track in which the audio signals are recorded. In a practical embodiment of machine 10, if cue signal recording switch 33 is actuated once, a single burst of cue signal is recorded for a predetermined time duration. This cue signal is an oscillating signal of predetermined frequency and is sometimes referred to herein as a cue tone. In one embodiment, the frequency of this cue tone is 15 Hz. If cue signal recording switch 33 is released and then re-actuated within a predetermined time period, then two successive bursts of cue tone are recorded, these two bursts being separated by a predetermined interval. The single burst of cue tone is used as a "letter" signal, representing the end/beginning of a letter, message, or the like. The two bursts of cue tone represent an "instruction" signal and may be used to indicate the location of particular instructions which are recorded by the user of machine 10. If desired, cue signal recording switch 33 may be replaced by a so-called letter switch and an instruction switch. Actuation of the letter switch results in the recording of a single burst of cue tone; and the actuation of the instruction switch results in the recording of two bursts of cue tone. This generation and recording of cue signals is described in greater detail in copending application Ser. No. 178,357 filed Aug. 15, 1980, now U.S. Pat. No. 4,378,577.

Microphone unit 12 also is provided with a fast-forward switch 35. When this fast-forward switch is actuated, the fast-forward mode of operation is selected for machine 10. It is appreciated that, in the fast-forward mode, the magnetic tape is transported in the forward direction at a relatively high speed. If a cue signal is recorded on the magnetic tape, this cue signal is detected and a suitable indication is provided to the user. Thus, actuation of fast-forward switch 35 allows the user to access particular information on the magnetic tape rapidly, the location of which is indicated by a previously recorded cue signal.

Microphone unit 12 also is provided with a record switch 36 which, when actuated, disposes machine 10 in the recording mode of operation. Record switch 36 is similar to record lock switch 32, except that the actuation of the record switch maintains the recording mode of operation only for so long as this switch remains actuated. As mentioned above, the actuation of record lock switch 32 latches the machine in the recording mode until, for example, stop switch 38 is operated.

Stop switch 38, in addition to releasing machine 10 from the record mode which had been selected by the actuation of record-lock switch 32, also releases the machine from the play mode. This latter mode is selected by the actuation of rewind/play switch 37. When this switch is actuated, the aforementioned fast motor is energized so as to rewind the magnetic tape at its relatively high speed. Upon the release of rewind/play switch 37, the fast motor is de-energized, and the slow motor is energized so as to drive the magnetic tape in its forward direction at its normal speed. Furthermore, the reproducing circuit included within machine 10 is conditioned so as to reproduce audio signals from the magnetic tape. As mentioned above, these audio signals are transduced by the speaker integrally provided within machine 10 or by the speaker integrally provided in microphone unit 12.

Preferably, control switches 34 are spring-actuated. When any of the control switches is actuated, or "pushed", a suitable signal, preferably an encoded signal, is produced to identify the particular switch which has been actuated and to represent the particular operating mode which has been selected. An encoder may be provided in microphone unit 12 so as to produce a 3-bit digital signal identifying the particular control switch which has been actuated. This 3-bit signal is communicated to a connector plug 64 by a multi-wire cable 63.

Although not shown in FIG. 1, the jack, or connector, into which plug 64 is inserted also is adapted to receive a plug which is electrically coupled to a foot-pedal switch arrangement, whereby a transcriptionist may establish selective operating modes for machine 10 in order to transcribe information which has been dictated onto the magnetic tape. For example, the foot-pedal switch arrangement may produce 3-bit signals identifying the actuation of a play switch, a fast-forward switch, a rewind switch and the like. In addition, a particular electrical connecting pin on the connector to which plug 64 is inserted may be adapted to be selectively short-circuited when microphone unit 12 is connected thereto and may be open-circuited when the foot-pedal switch arrangement is connected, thereby applying a predetermined signal level at this pin to identify whether a microphone unit or a foot-pedal switch arrangement is connected to machine 10. It will be appreciated that this particular signal facilitates the interpretation of the 3-bit signal which is supplied to the connector either in response to the actuation of control switches 34 of microphone unit 12 or in response to the selected actuation of the foot-pedal switch arrangement.

Machine 10 also is provided with a connector 66 adapted to receive a head-phone plug so as to supply reproduced audio signals to head-phone transducers which may be connected thereto. A transcriptionist thus is provided with audible signals via such head-phone transducers, in order to transcribe the information which has been recorded.

Although not illustrated herein, machine 10 also is provided with a cradle switch disposed within a cradle structure adapted to receive and support microphone unit 12 when the machine is not operated. This cradle switch is used as a power on/off control so as to supply appropriate electrical power to machine 10 whereby the desired operation thereof can be performed.

Also not shown in FIG. 1 is a connector adapted to be coupled to a telephone adapter unit, whereby the machine may communicate via conventional telephone lines. A suitable telephone adapter is described in copending application Ser. No. 146,779, and is operable to control machine 10 to function as a telephone-answering device.

Dictation/transcription machine 10 is provided with a plurality of control switches 18, each switch being manually operable to control a particular function or establish an appropriate mode of operation. Typical of such control switches are a POWER switch 42, a TEL- EPHONE switch 44, a CONFERENCE switch 46, a SPEAKER switch 48, a STOP switch 50, an INSERT switch 52, a SEARCH switch 54, a REWIND switch 56, a FAST FORWARD switch 58, a SCAN switch 60 and an ERASE switch 62. Preferably, each of these switches is formed as a so-called touch-sensitive switch and is adapted to produce a signal representing the actuation thereof when touched by the user of machine 10. For purposes of the present discussion, the POWER, TELEPHONE, CONFERENCE and SPEAKER switches are referred to herein as "toggle" switches, and the remaining switches are referred to herein as keyboard switches. As suggested by the expression "toggle", each toggle switch is actuated when touched by the user, and remains actuated even if the user removes his finger therefrom. To deactuate the switch, that is, to release the mode of operation selected thereby, the actuated switch must be touched again.

POWER switch 42 is adapted, when actuated, to supply energizing power to dictation/transcription machine 10. When changed over to its "on" condition, POWER switch 42 supplies suitable energization to power, or drive, the normal-speed and fast-speed motors, the recording and reproducing circuitry, the displays (to be described) and various additional accessory devices (not shown) which might be connected to the dictation/transcription machine. Actuation of POWER switch 42 is detected by a microprocessor and is indicated by the illumination of a suitable indicating lamp which, preferably, is disposed beneath the POWER switch. It should be appreciated that this microprocessor normally is supplied with energizing potential even when POWER switch 42 is in its "off" condition. Hence, a voltage regulating circuit included within dictation/transcription machine 10 may be connected directly to AC mains in order to supply the microprocessor with such energizing potential.

POWER switch 42 cooperates with a so-called accessory power switch for supplying energizing power to the dictation/transcription machine. This accessory power switch may be included in an accessory device (not shown) which might replace microphone unit 12 for use with dictation/transcription machine 10. For example, a typical telephone-type handset may be used, and this telephone-type handset may be provided with an accessory power switch. Additionally, dictation/transcription machine 10 may be provided with a cradle (not shown) to support, or store, microphone unit 12 during those periods when the machine is not used. A suitable cradle power switch may be provided such that when microphone unit 12 is removed from the cradle, the cradle power switch assumes its ON condition. Still further, the aforementioned telephone adapter which may be used with dictation/transcription machine 10 may, when operated, such as in response to an incoming telephone call, supply a "power-on" signal to the microprocessor, thus simulating the manual actuation of POWER switch 42. The manner in which operation of the power switch functions to turn power "on" or "off" is described in greater detail in copending application Ser. No. 178,106, filed Aug. 14, 1980.

TELEPHONE switch 44 is adapted, when actuated, to enable dictation/transcription machine 10 to respond to incoming telephone calls. In this mode, the dictation/transcription machine is capable of functioning either as a telephone-answering machine or as a so-called remote dictating machine. In the latter mode of operation, audio information, such as dictation, is transmitted to the machine via telephone lines for recording on the magnetic tape in cassette 22. The manner in which dictation/transcription machine 10 operates in this telephone mode of operation is described in aforementioned copending application Ser. No. 146,779.

In addition, when TELEPHONE switch 44 is actuated, energizing power is supplied to the dictation/transcription machine even if POWER switch 42 had assumed its "off" condition. Also, indicator lamps which, preferably, are provided beneath each of POWER switch 42, TELEPHONE switch 44, CONFERENCE switch 46 and SPEAKER switch 48, all are illuminated to indicate that machine 10 has been operated to assume its telephone mode of operation. When TELEPHONE switch 44 is actuated once again, the telephone mode of operation is terminated and, moreover, the previous conditions associated with POWER switch 42, CONFERENCE switch 46 and SPEAKER switch 48 are resumed. That is, dictation/transcription machine 10 assumes the same mode of operation that it had assumed prior to the original actuation of TELEPHONE switch 44. This is described in greater detail in copending application Ser. No. 178,106 filed Aug. 14, 1980.

CONFERENCE switch 46 is adapted, when actuated, to establish a "conference" mode of recording. In this mode, the amplification of the audio signals which are recorded on the magnetic tape is increased. Thus, suitable signals of relatively low level received by microphone unit 12 are amplified substantially so as to be recorded with sufficient gain. A "conference" among plural individuals who are located at varying distances from microphone unit 12 is recorded with adequate fidelity. In addition, when CONFERENCE switch 46 is actuated, the lamp disposed beneath the CONFERENCE switch is illuminated so as to provide a suitable indication that the conference mode has been assumed.

SPEAKER switch 48 is adapted, when actuated, to assume a first condition, whereby the loudspeaker included within dictation/transcription machine 10 is enabled, or to assume a second condition, whereby the loudspeaker included within microphone unit 12 is enabled. The enabled loudspeaker serves to transduce the audio signals which are reproduced from the magnetic tape, whereby these audio signals are reproduced as audible information which is readily perceived by the user. In addition, the indicator lamp disposed beneath SPEAKER switch 48 is illuminated when this switch assumes its first condition, and is extinguished when this switch assumes its second condition. If desired, this lamp may be illuminated when SPEAKER switch 48 assumes its second condition and may be extinguished when this switch assumes its first condition. A more detailed description of the manner in which the microprocessor detects the actuation of SPEAKER switch 48 is described in copending application Ser. No. 178,106.

The remaining keyboard switches provided with dictation/transcription machine 10 now will be briefly described. STOP switch 50 is manually operable to establish a "stop", or quiescent, mode of operation for the dictation/transcription machine. Typically, switch 50 may be operated to terminate a fast-forward or rewind mode of operation. The microprocessor, when carrying out its programmed routine, detects the operation of the STOP switch so as to establish the "stop" mode.

INSERT switch 52 is adapted, when actuated, to establish an "insert" mode of operation, whereby audio information is recorded, via microphone unit 12, onto a separate channel, or track, of the magnetic tape in cassette 22. As is conventional, the magnetic tape in this cassette is provided with at least two tracks for recording information. Normally, information is recorded on one track while the magnetic tape is driven from its supply reel to its take-up reel. If cassette 22 is turned over, the second track is used to record such audio information. In the "insert" mode, as established by the actuation of INSERT switch 52, normal dictation is recorded on one track and special "insert" information is recorded on the second track. In addition, a superimposed, higher frequency tone signal is recorded on the first track so as to indicate the location along the magnetic tape at which the "insert" information is recorded on the second track.

As will be described below, when a transcriptionist prepared to transcribe dictation which has been recorded on the magnetic tape, SCAN switch 60 is actuated to rewind the tape and, during this rewind operation, to detect all "letter" and "instruction" signals which have been recorded thereon. The relative locations along the tape at which such "letter" and "instruction" signals are recorded are indicated by an index/instruction display 24. Then, once the tape is satisfactorily rewound, SEARCH switch 54 may be actuated to establish a "search" mode of operation, whereby the tape now is driven in the forward direction at a relatively fast speed. In this "search" mode, whenever an instruction indicator signal is detected, the mode of operation of dictation/transcription machine 10 is changed over to a "play" mode; and instructional information, which may be recorded following the instruction indicator signal, is reproduced. Thus, prior to the actual transcription of the information recorded on the magnetic tape, the transcriptionist is made aware of the instructional information which may have been recorded, so as to improve efficiency in the overall transcription.

To carry out the "insert" mode of operation, the recording/playback transducer, or head, preferably is provided with two channels, or gaps, respectively aligned with the two tracks of the magnetic tape. During normal dictation, the audio signals are supplied to the first channel so as to be recorded in the first track. In response to the actuation of INSERT switch 52, the audio signals are supplied to the second channel so as to be recorded in the second track. During a normal playback mode of operation, the audio signals which had been recorded on the first track are reproduced by the first channel of the recording/playback transducer. The inserted information is reproduced from the second track by the second channel of the transducer.

If desired, the user of dictation/transcription machine 10 may record special instructional information in the very same track in which normal dictation is recorded, that is, in the first track. The location of such instructional information is indicated by recording an "instruction" signal in the manner described hereinabove. That is, the dictator may actuate cue switch 33 on microphone unit 12 twice in succession or, alternatively, may operate an instruction switch. When SEARCH switch 54 is actuated, the magnetic tape in cassette 22 is driven in the forward direction at its fast speed, and cue signal detecting electronics (not shown) are energized to detect "instruction" signals. Upon detection of such an "instruction" signal, the mode of operation of dictation/transcription machine 10 is changed over to a normal play mode, whereby the instructional information which is recorded in the first track on the magnetic tape is reproduced. Thus, when SEARCH switch 54 is actuated, the magnetic tape is scanned, or searched, for the location of "instruction" signals, and then the instructional information which is recorded following such instruction indicating signals is reproduced.

REWIND switch 56 is adapted, when operated, to produce a rewind actuating signal which is supplied to the microprocessor. This rewind actuating signal is detected and used to establish a "rewind" mode, whereby a rewind circuit (not shown) is actuated, and a suitable fast-speed drive motor is energized to transport the magnetic tape in the reverse direction at the fast speed.

FAST FORWARD switch 58 may be similar to REWIND switch 56 and is adapted, when operated, to establish the "fast-forward" mode of operation. More particularly, the operation of the FAST FORWARD switch produces an actuating signal which is detected and used to energize a fast-forward circuit and to energize the fast-speed motor, whereby the magnetic tape is driven in the forward direction at the fast speed. In one embodiment, the operation of either REWIND switch 56 or FAST FORWARD switch 58 does not enable the detection of "letter" or "instruction" indicating signals recorded on the magnetic tape. Rather, the tape merely is transported in the reverse or forward direction, as selected.

SCAN switch 60, when operated, produces a scan signal which, when detected, serves to establish the "scan" mode of operation. That is, the fast-speed motor is energized to rewind the magnetic tape in cassette 22; and cue signal detecting electronics are enabled to detect "letter" and "instruction" cue signals which may be recorded on the magnetic tape. When a "letter" signal is detected, an indication thereof is provided on index/instruction display 24. When an "instruction" signal is detected, a suitable instruction indication is provided on the index/instruction display.

ERASE switch 62 is adapted to be actuated concurrently with either REWIND switch 56 or FAST-FORWARD switch 58 so as to establish an "erase" mode. The actuation of the respective switches serves to energize the fast-speed motor so as to drive the magnetic tape in either the reverse or forward direction. Also, an electromagnetic erase circuit is triggered so as to erase the audio information which may have been recorded previously on the magnetic tape.

As illustrated, dictation/transcription machine 10 is provided with index/instruction display 24 and with a numerical display 26. The index/instruction display is comprised of a linear array $25_L$ of light indicating elements, such as LED's, LCD's or the like, each being selectively energized to indicate the relative location of a "letter" signal recorded on the magnetic tape. A suitable one of elements $25_L$ also is energized to display a cursor indication of the present position of the magnetic tape. Display 24 also is comprised of another linear array $25_I$ of light indicating elements, similar and parallel to elements $25_L$, to indicate the relative locations of "instruction" signals on the tape. Elements $25_{L0}$, $25_{L1}$, . . . $25_{L31}$ are uniformly spaced, and each is associated with an increment of recording time, such as a minute. Likewise, elements $25_{I0}$, $25_{I1}$, . . . $25_{I31}$ are uniformly spaced. In the illustrated embodiment, each array is formed of 32 light indicating elements.

As mentioned above, display 24 provides indications of the locations of particular "letter" and "instruction" signals which are recorded on the magnetic tape, which signals are detected during a "scan" or a "search" operation. The index, or cursor, indication of the present relative location of the magnetic tape, as provided by display 24, indicates that portion of the tape which is at or within the vicinity of the recording/playback transducer. As the tape is advanced from one end towards the other, a corresponding cursor indication is advanced across display 24. This cursor indication appears as a flashing LED $25_{L0}$, $25_{L1}$, ... $25_{L31}$. The particular LED which is flashed provides a representation of the present position of the magnetic tape. For example, LED $25_{L0}$ flashes to indicate that the tape is at its beginning portion, or is within the range of 0 to one minute. LED $25_{L1}$ flashes to indicate that the tape has been advanced by the amount of one to two minutes of recording time. The remaining LED's flash to indicate analogous positions of the tape.

Desirably, cassette 22 contains a magnetic tape whose length corresponds to a recording time of 30 minutes. If a longer tape is used, that is, if the cassette exhibits a larger recording time capacity, then the right-most LED $25_{L31}$ flashes whenever that tape has been advanced to and beyond the location corresponding to 31 minutes of recording time.

Numerical display 26 may be comprised of a multi-digit display, such as a three-digit seven-segment display which is adapted to display the total length of dictation which has been recorded on the magnetic tape. In accordance with one advantageous feature of this invention, the three-digit display represents the quantity of recording time which has been consumed. As will be described below, when machine 10 is disposed in its transcribe mode, display 26 indicates the quantity, in terms of time, of the message which remains to be transcribed. Display 26 provides an indication of minutes and tenths of minutes, and is sometimes referred to herein as the "minutes" display. The manner in which this display is updated as a function of tape movement is described below.

A CLEAR switch 27 and a HOLD switch 29, which may be of similar construction as aforementioned switches 18, are provided to control index/instruction display 24 and numerical display 26. The CLEAR switch, when operated, serves to clear, or reset, displays 24 and 26. Thus, the information represented by these displays may be "erased" and the displays may be reset to an initial condition upon the operation of CLEAR switch 27. For example, let is be assumed that machine 10 exhibits a "standby" mode, as when AC power first is supplied thereto, or a power failure or other interruption occurs in the AC power. In this condition, and as will be described, if POWER switch 42 is in its "on" condition, all of light indicating elements $25_L$ and $25_I$, together with all segments of numerical display 26, are flashed at a predetermined rate. This flashing apprises the user of the occurrence of a fault condition. The operation of CLEAR switch 27 rests displays 24 and 26 to an initial state, whereby all "letter" and "instruction" indications are cleared, the cursor is reset to the left-most element $25_{L0}$, and numerical display 26 is reset to indicate "00.0".

HOLD switch 29 functions as a toggle switch and serves, when actuated, to "freeze" the indications then provided by displays 24 and 26. Thus, these displays are "latched" and are not affected by subsequent operation of machine 10. One advantage of this "hold" mode is to enable the user of machine 10 to replace the cassette then loaded therein with a new cassette whose recording or transcription exhibits a higher priority, without disturbing the displayed information associated with the replaced cassette. Then, upon completing the high-priority task, the original cassette is re-loaded, HOLD switch 29 is re-actuated (or released) and displays 24 and 26 once again are enabled to display "letter", "instruction" and cursor indications, as well as the quantity of tape which has been transported. To indicate this "hold" mode, display 26 is selectively energized to display "HLd".

Displays 24 and 26 preferably are controlled by a microprocessor, such as Model MK3870. The following description relates to flow charts which explain the various subroutines carried out by the microprocessor in order to control these displays. It will become readily apparent to those of ordinary skill in the art that, if desired, this microprocessor-implementation may be replaced by discrete circuitry which is capable of carrying out the operation described below.

Figure 2:
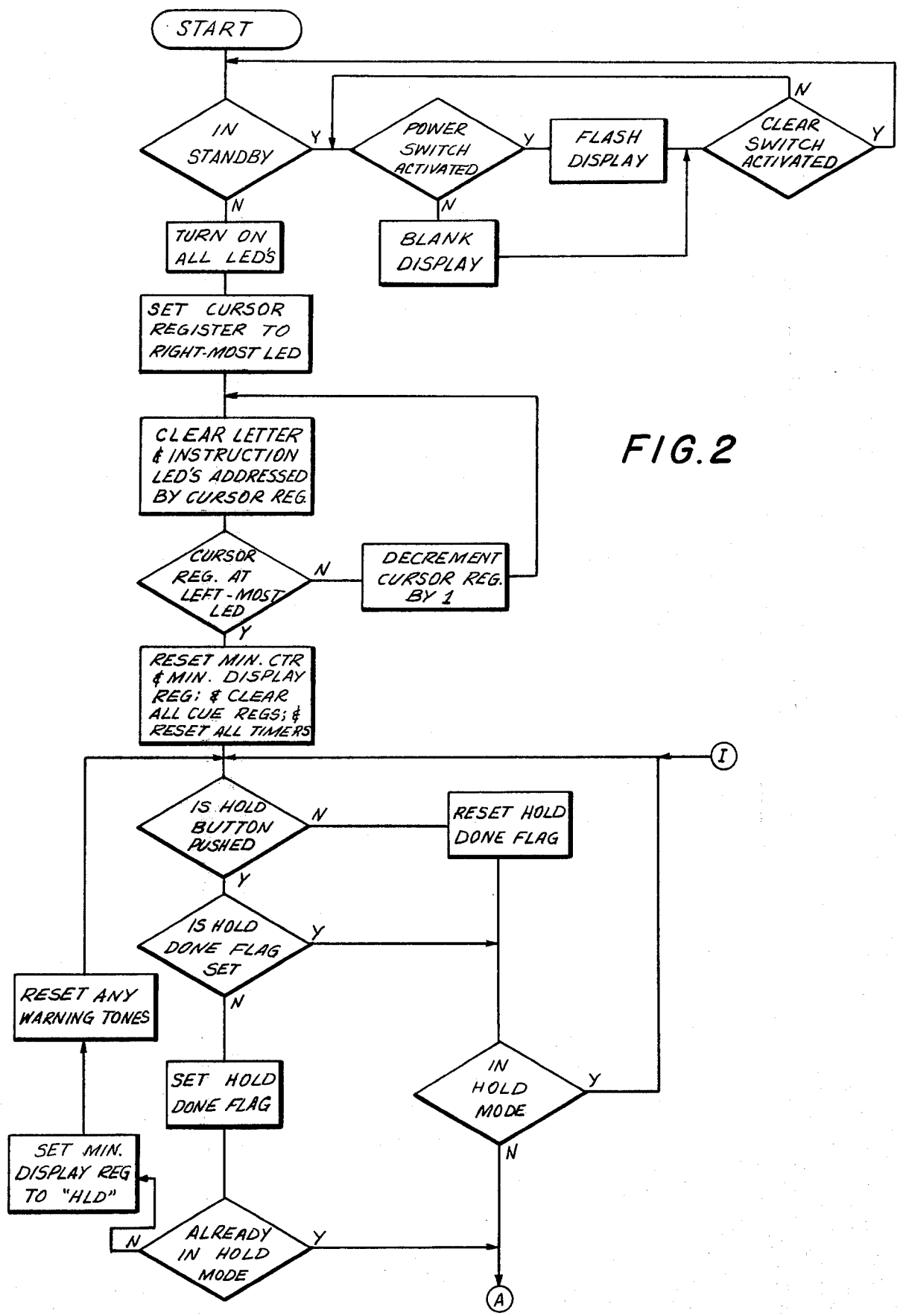
FIG. 2 is a flow chart of some of the routines which are carried out by the micro-processor that is used to implement the present invention.

Referring now to FIG. 2, the flow chart illustrated therein represents the operation of the microprocessor during an initialized mode. The illustrated subroutine commences from the START condition, and inquiry first is made as to whether machine 10 is disposed in its "standby" condition. It is recalled that this condition obtains when, for example, AC power first is supplied to the dictation/transcription machine, or when a fault condition, such as power loss, a substantial drop in AC power, or the like, occurs. Let it be assumed that the machine is disposed in its "standby" condition, for example, power is first supplied thereto, as by initially connecting the dictation/transcription machine to the AC mains. Inquiry then is made as to whether POWER switch 42 is actuated to its "on" condition. If this inquiry is answered in the affirmative, all of the light indicating elements $25_L$ and $25_I$ are flashed. For the purpose of the present description, it is assumed that these elements are LED's, although LCD's and other visual indicators may be used, as desired. In addition to flashing the LED's included in index/instruction display 24, numerical display 26 also is flashed. Thus, the user of dictation/transcription machine 10 is apprised that the machine is disposed in its "standby" condition, which may be indicative of the occurrence of a fault condition. If the POWER switch had not been actuated, that is, it had been in its "off" condition, the display is blanked.

Inquiry next is made as to whether CLEAR switch 27 has been operated, or pushed. If not, the microprocessor remains in the illustrated loop, whereby displays 24 and 26 either are flashed or blanked, depending upon the condition of POWER switch 42, and inquiry as to whether the CLEAR switch has been pushed is made. When the CLEAR switch is actuated, the subroutine returns to its START condition to extinguish the "standby" condition.

If dictation/transcription machine 10 is not disposed in its "standby" condition, such as when the CLEAR switch has been pushed, the subroutine proceeds to energize all of the LED's in the display, and then to set a cursor register to address the right-most LED, that is, LED $25_{L31}$. As will be explained in greater detail below, the microprocessor includes various registers, one of which is designated the "cursor" register. This cursor register is adapted to have a binary count loaded therein, which count is used to address, or identify, a particular one of "letter" LED's $25_L$ or "instruction" LED's $25_I$. The particular one of these LED's which is addressed is further limited by an identification bit, also loaded into the cursor register, which is used to select either a "letter" or "instruction" LED. For example, if this identification bit is a binary "0", then the particular "letter" LED $25_{L0}, 25_{L1}, \ldots 25_{L31}$ is selected to provide a cursor indication, in accordance with the binary count loaded into this cursor register. As an example, let it be assumed that the cursor register is a multi-bit register. Five bits stored in this register are used to identify a particular one of the 32 "letter" or "instruction" LED's to be selected; and the identification bit distinguishes between these "letter" and "instruction" LED's. To carry out the present instruction of setting the count in the cursor register to address the right-most LED, the identification bit is a binary "0", and the cursor register is loaded with the count [11111].

The next-following instruction functions to clear both the letter and the instruction LED addressed by the count loaded into the cursor register, after a suitable delay. At the present time, the cursor register addresses the right-most LED. For the purpose of the present discussion, it is assumed that the right-most LED is LED $25_{L31}$ (and $25_{I31}$) and the left-most LED is $25_{L0}$ (and $25_{I0}$). In accordance with the present instruction, LED's $25_{L31}$ and $25_{I31}$ both are cleared. It is recalled that, prior to this time, all of the "letter" and "instruction" LED's had been energized. Now, "letter" LED $25_{L31}$ and "instruction" LED $25_{I31}$ both are cleared. That is, these LED's are blanked, or extinguished.

Next, inquiry is made as to whether the cursor register is addressing the left-most LED, that is, LED $25_{L0}$ (or $25_{I0}$). If not, the cursor register is decremented by one count. In the present example, the cursor register has been decremented from a count of 31 to a count of 30. Hence, this inquiry is answered in the negative, and the cursor register is decremented. Then, after a suitable delay, both the "letter" and "instruction" LED's now addressed by the cursor register, that is, LED's $25_{L30}$ and $25_{I30}$ are cleared. Inquiry as to whether the count now present in the cursor register identifies LED #0 again is answered in the negative, the cursor register is decremented, and the foregoing process is repeated. Hence, each "letter" and "instruction" LED is cleared, or extinguished, sequentially from LED #31 to LED #0. By reason of the aforementioned delay, the cleared LED's appear to "shift" sequentially from right-to-left, as viewed in FIG. 1.

When the cursor register has been decremented to a count which identifies the left-most LED's, for example, when the cursor register has been decremented to a count of zero, the inquiry as to whether the cursor register identifies the left-most LED is answered in the affirmative. Then, a minutes counter and a minutes display register are reset, all of the cue registers (to be described) are cleared, and the various timers (e.g. to control the flashing of the displays, the duration of warning tones, and the like) are reset. As will be described below, a minutes counter is provided to count motion pulses which are generated when the magnetic tape is transported. As one example of suitable motion pulse generating circuitry, a so-called chopper wheel having a plurality of circumferentially disposed apertures therein may be provided. This chopper wheel may be mechanically coupled to the supply or take-up reel of the tape transport mechanism so as to rotate as tape is driven. If the chopper wheel is disposed between a light source and a light detector, then each passage of an aperture through the light beam is sensed by the light detector to produce a chopper pulse. Alternatively, the chopper wheel may be provided with a plurality of magnetic elements circumferentially disposed thereon and rotatable past a fixed pick-up, or magnetic sensor, which generates a chopper pulse. In either embodiment, these chopper pulses are utilized to derive motion pulses. One example of a suitable chopper wheel arrangement is illustrated in FIG. 9, wherein chopper wheel 92 is mechanically coupled to a shaft 94 that is rotated as tape is transported. Chopper wheel 92 is provided with circumferentially disposed apertures 96. A pair of light sources, such as lamps 98a and 98b, are disposed opposite one surface of chopper wheel 92, each light source emitting a light beam toward a respective one of phototransistors 100a and 100b, respectively. When an aperture 96a passes between light source 98a and phototransistor 100a, light passes therethrough to impinge upon the phototransistor, thereby producing an output pulse at its emitter electrode. Similarly, as this aperture 96a passes between light source 98b and phototransistor 100b, the phototransistor generates a pulse. As will be described, two light sources and two phototransistors are used in order to detect the direction in which chopper wheel 92 rotates and, thus, indicate the direction in which the tape is transported.

In the alternative embodiment shown in FIG. 9A, chopper wheel 92 is provided with a pair of circumferentially disposed magnetic elements 196a and 196b which rotate past fixed magnetic sensors, or pick-ups, 200a and 200b. When a magnetic element passes a pick-up, an output pulse is generated. As with the photo-optic embodiment, two sensors are used to detect the direction in which chopper wheel 92 rotates.

Let it be assumed that a magnetic tape having a recording-time capacity of 30 minutes is used. Let it be further assumed that chopper wheel 92 in FIG. 9 is provided with eight apertures 96. If the tape is fully loaded on the supply reel, then, for uniform rotary speed of chopper wheel 92, one chopper pulse is generated when an incremental length of tape is transported. Of course, and as will be described below, if chopper wheel 92 is rotatably driven by the supply reel, then the rotational speed of the chopper wheel increases as the quantity of tape wound upon the supply reel, that is, the supply reel diameter, decreases. Hence, as tape is driven in the forward direction, a chopper pulse is generated for progressively smaller incremental lengths of tape. Similarly, if the chopper wheel is driven by the take-up reel, a chopper pulse is generated for progressively larger incremental lengths of tape. This non-linearity in the relationship between the number of chopper pulses which are generated and the quantity of tape remaining on the supply reel is taken into account in accordance with another aspect of the present invention. For the purpose of the present description, it is sufficient merely to appreciate that the chopper pulses are counted until a predetermined number of such pulses is sensed (for example, eight pulses) to represent one-tenth of a minute. Then, these tenths of minute pulses are counted, in decimal form by the minutes counter. The minutes counter thus provides a count, incremented in response to the chopper pulses, representing tens, units and tenths of minutes. It is this minutes counter which is reset when the cursor register has been decremented to address the left-most LED.

The minutes display register is adapted to drive numerical display 26 and, during a recording mode of operation, the contents of the minutes counter (that is, the digital representation of tens, units and tenths of minutes) is loaded into the minutes display register to enable a corresponding display of the amount of tape, in terms of time, which has been transported. This minutes display register also is reset, resulting in a display of "00.0" in numerical display 26.

In one embodiment of the present invention, a plurality of cue registers is provided, each cue register being associated with a respective pair of "letter" and "instruction" LED's. For example, cue register #0 is associated with LED's $25_{L0}$ and $25_{I0}$, cue register #1 is associated with LED's $25_{L1}$ and $25_{I1}$, ... and cue register #31 is associated with LED's $25_{L31}$ and $25_{I31}$. In certain operating modes, such as the scan mode, to be described, respective cue registers are adapted to store identification bits, described above, together with counts which are derived from the contents of the minutes counter. If data comprising the identification bit and a count is loaded into a particular cue register, then its associated "letter" or "instruction" LED is energized in accordance with the state of the identification bit. This is described in greater detail hereinabove in conjunction with the scan mode. As will also be described, each cue register may store a count equal to, or derived from, the number of chopper wheel pulses that have been generated as chopper wheel 92 rotates. Thus, a cue register may selectively store either a minutes count (including tens, units and tenths of minutes) or a chopper pulse count in accordance with particular operations, as will be described.

After the minutes counter, minutes display register, cue registers and timers are reset, the subroutine advances to inquire whether HOLD switch 29 is pushed. If this inquiry is answered in the negative, a "hold done" flag is reset, and inquiry next is made as to whether machine 10 is disposed in its hold mode. Assuming that HOLD switch 29 is not and has not been pushed, machine 10 will not be disposed in its hold mode, and the microprocessor advances to the subroutine illustrated by the flow charts shown in FIG. 3. However, if HOLD switch 29 had been pushed to establish the hold mode, then, even though this switch is released, machine 10 will remain disposed in its hold mode; and the illustrated subroutine will cycle through the loop formed of the inquiry as to whether the HOLD switch has been pushed, resetting the "hold done" flag and then inquiring as to whether the machine still is disposed in its hold mode.

Let it be assumed that machine 10 is not in its hold mode, but HOLD switch 29 is pushed. Accordingly, the inquiry as to whether this HOLD switch has been pushed is answered in the affirmative, and the next-following inquiry as to whether the "hold done" flag is set is answered in the negative. Then, since HOLD switch 29 is pushed but the "hold done" flag has not been set, the instruction to set this "hold done" flag is carried out. Once the "hold done" flag is set, inquiry is made as to whether machine 10 already had been disposed in its hold mode. In accordance with the present example, it has been assumed that HOLD switch 29 is pushed for the first time and, therefore, machine 10 had not been disposed presently in its hold mode. Consequently, this inquiry is answered in the negative. Accordingly, and as illustrated in FIG. 2, the minutes display register is selectively loaded with information so as to energize numerical display 26 to display the message "HLd". This can be achieved by suitably energizing the respective segments of each of the 7-segment displays constituting numerical display 26. After this message is displayed, the warning tones that might have been generated are reset. Then, the hold subroutine illustrated in FIG. 2 returns to the inquiry as to whether HOLD switch 29 is pushed.

As long as the user's finger remains in actuating relationship with HOLD switch 29, the hold subroutine cycles through the loop formed of the following inquiries, each of which is answered in the affirmative: whether HOLD switch 29 is pushed, whether the "hold done" flag is set and whether machine 10 is disposed in its hold mode.

When HOLD switch 29 is released, following the initiation of the hold mode, the hold subroutine cycles through the aforementioned loop wherein the inquiry as to whether the HOLD switch is pushed is answered in the negative, the "hold done" flag is reset, and the inquiry as to whether the machine is disposed in its hold mode is answered in the affirmative. Of course, as the subroutine cycles through this loop, the message "HLd" remains displayed on numerical display 26.

When the HOLD switch next is pushed, the inquiry as to whether this switch is pushed is answered in the affirmative, and the next-following inquiry as to whether the "hold done" flag has been set is answered in the negative. Accordingly, the "hold done" flag is set. Now, since HOLD switch 29 has been re-actuated to depart from the hold mode, the inquiry as to whether the machine 10 already is disposed in this hold mode is answered in the affirmative. Accordingly, the microprocessor exits from the hold subroutine and advances to the subroutine illustrated by the flow chart of FIG. 3. As will be described below, depending upon the particular operation which is selected, for example, depending upon whether a scan mode, a transcribe mode or a dictate mode is selected, numerical display 26 provides a suitable indication commensurate with the selected operation.

Figure 3:
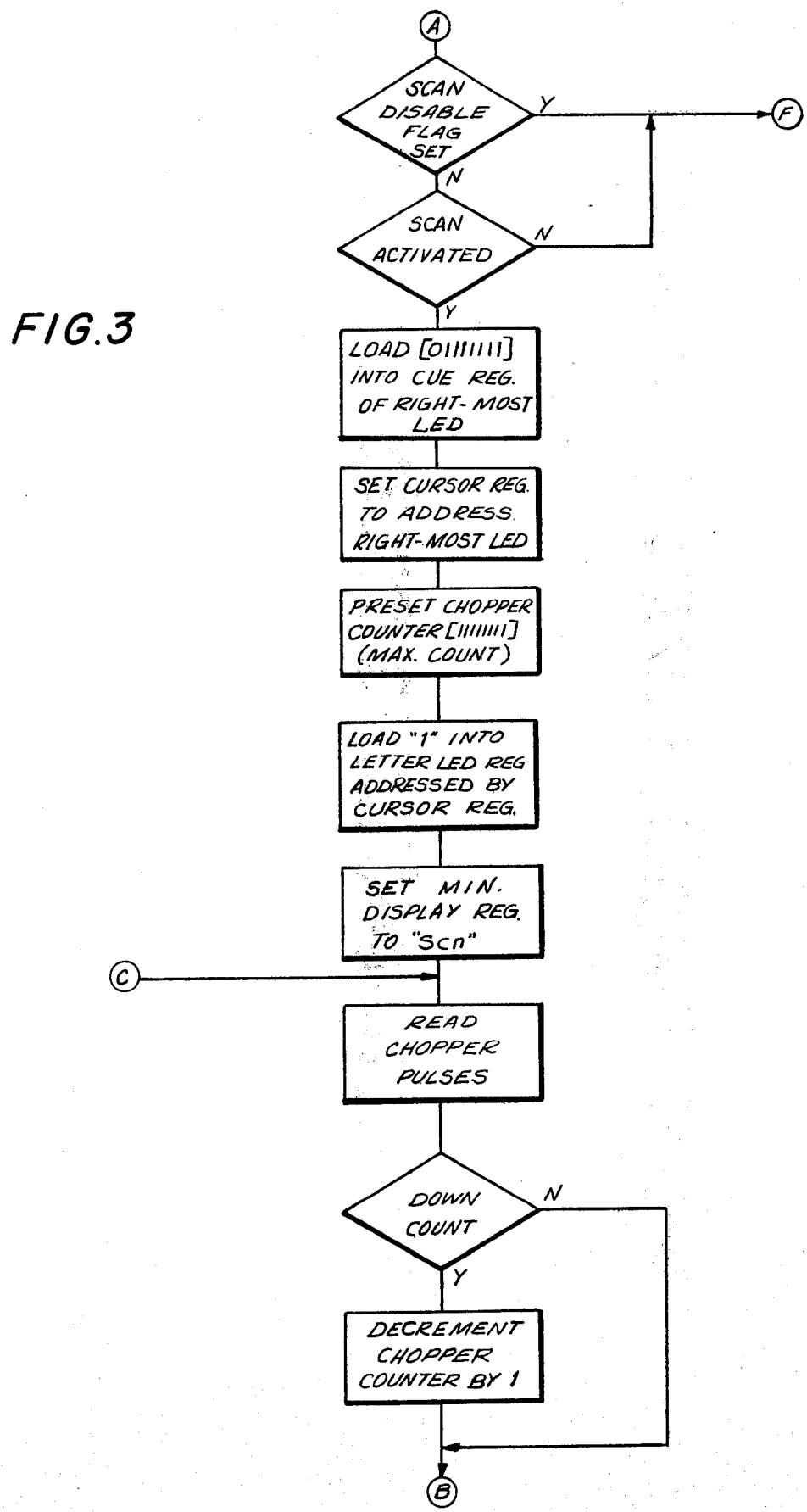
FIGS. 3 and 4 are flow charts representing the scan operation that is carried out in accordance with the present invention.

Referring now to FIG. 3, after the microprocessor exits from the hold subroutine, inquiry is made as to whether a "scan disable" flag is set. If machine 10 has been operated, even momentarily, to transport the magnetic tape, either to record information thereon, play back information therefrom or advance or rewind the tape, the "scan disable" flag is set. If the "scan disable" flag is not set, for example, a fresh cassette is loaded into compartment 20 of machine 10, or CLEAR switch 27 is actuated, the present inquiry is answered in the negative. Inquiry then is made as to whether SCAN switch 60 has been activated. It is recalled that, by pushing this SCAN switch, a scan operation is carried out. Let it be assumed, for the purpose of the present discussion, that SCAN switch 60 is not activated. Hence, this inquiry is answered in the negative, and the microprocessor advances to the record/playback subroutine illustrated by the flow chart shown in FIG. 7.

Figure 7:
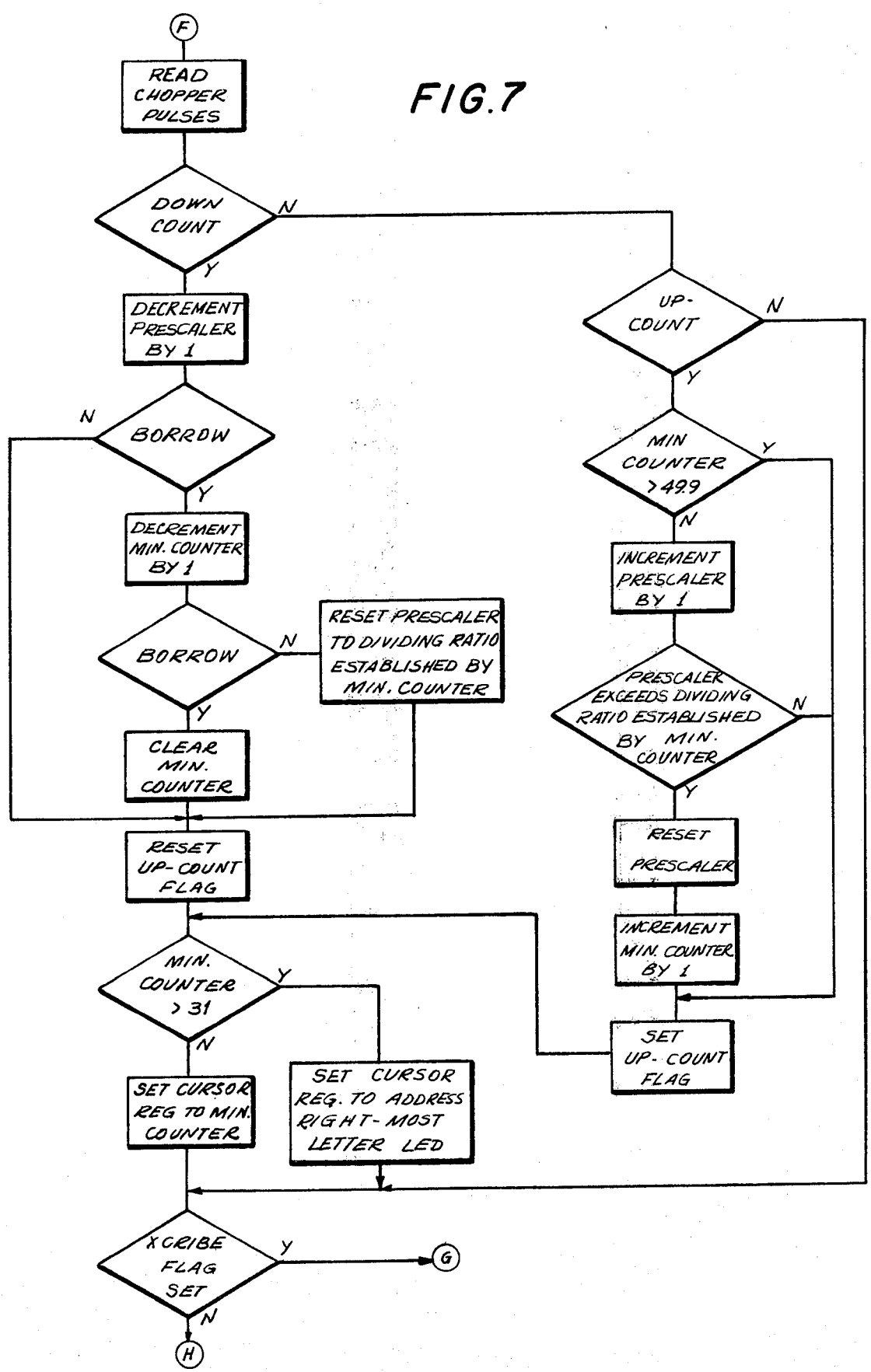
FIGS. 7 and 8 are flow charts of the displays which are provided during a record operation.

The initial instruction shown in the flow chart of FIG. 7 is to read the chopper pulses which are generated when tape is transported. It is recalled, from the discussion set out hereinabove with respect to FIG. 9, that pulses are generated at the emitter electrodes of phototransistors 100a and 100b when each aperture 96 rotates to a position whereby the light beam generated by light source 98a or 98b passes therethrough to impinge upon phototransistor 100a or 100b, respectively; or, with respect to FIG. 9A, pulses are generated by pick-ups 200a and 200b when each magnetic element 196a or 196b rotates therepast. Let it be assumed that chopper wheel 92 rotates in the clockwise direction when tape is transported in the forward direction. FIG. 9 represents a block diagram of circuitry which can be used to detect the rotation of chopper wheel 92 and also the direction in which tape is driven. This circuitry, which can be implemented by a microprocessor program, also can be used to supply chopper pulses to the microprocessor. The circuitry shown in FIG. 9 includes a read register 102, a store register 104, a comparator 106 and a change register 108. Read register 102 is supplied with the pulses A and B generated at the emitter electrodes of transistors 100a and 100b (or by pick-ups 200a and 200b), which pulses are stored in stages A and B, respectively. Thus, when aperture 96a, for example, enables the light beam from light source 98a to impinge upon phototransistor 100a (or when magnetic element 196a rotates to pick-up 200a), a pulse A, shown in FIG. 10A, is supplied to read register 102 and is stored in stage A. Likewise, when aperture 96a rotates to permit the light beam from light source 98b to impinge upon phototransistor 100b (or when the magnetic element rotates to pick-up 200b), the pulse shown in FIG. 10B is produced at the emitter electrode of this transistor (or at the pick-up and is stored in stage B of the read register. Thus, as chopper wheel 92 rotates, stages A and B of read register 102 are supplied with binary "1" and "0" levels corresponding to the pulses generated by phototransistors 100a and 100b (or by pick-ups 200a and 200b).

The binary signal stored in stage A of read register 102 is compared periodically to the binary signal stored in stage A of store register 104 by comparator 106. Likewise, the binary signal stored in stages B of each read register 102 and store register 104 are compared, periodically, by comparator 106. A train of read pulses, shown in FIG. 10C, may be used to carry out this periodic comparison. It is appreciated that the frequency of the read pulses is much greater than the expected frequency of pulses A and B generated by phototransistors 100a and 100b (or by pick-ups 200a and 200b), respectively. After each comparison, the contents of read register 102 are transferred to storage register 104. Thus, registers 102 and 104, together with comparator 106, serve to compare the states of the presently produced pulses A and B to their immediately preceding states. If a change is detected, that is, if the present state of pulse A differs from the immediately preceding state thereof, comparator 106 supplies a binary "1" to stage A of change register 108. Likewise, if the present state of pulse B differs from the preceding state thereof, a binary "1" is supplied to stage B of the change register by comparator 106. FIGS. 10D and 10E represent the change pulse signals that are supplied to change register 108 by the comparator. If desired, each pulse signal representing a change in the state of pulse A, for example, the pulse signals shown in FIG. 10D, may be used to represent chopper pulses. Alternatively, the pulse signals shown in FIG. 10E may be used as such chopper pulses.

As an example, a read pulse (FIG. 10C) which occurs just prior to the positive transition in pulse A (FIG. 10A) compares the present state of pulse A, which is a binary "0", to the preceding state thereof, which also is a binary "0". Comparator 106 detects the absence of change in the state of pulse A to supply a binary "0" to stage A of change register 108. Also, the presently sampled binary "0" level of pulse A is transferred into stage A of store register 104. At the next read pulse (FIG. 10C), which is assumed to occur immediately following the positive transition in pulse A, the binary "1" level of this pulse is compared to the preceding binary "0", stored in stage A of store register 104. Comparator 106 detects the change in level of pulse A to supply a binary "1" to stage A of change register 108, as shown in FIG. 10B. Also, this binary "1" level of pulse A is transferred from read register 102 to stage A of store register 104. Upon the occurrence of the next read pulse, the present level of pulse A is a binary "1" and is compared to the preceding binary "1" stored in stage A of store register 104. Comparator 106 detects the absence of change in the state of pulse A to supply a binary "0" to change register 108. Thus, a pulse whose duration is equal to the period of the read pulses is generated by comparator 106 whenever a change in the state of pulse A or pulse B is detected.

From FIGS. 10A and 10B, it is appreciated that, when chopper wheel 92 rotates in the clockwise direction, the state of pulse B lags the state of pulse A. This lagging relationship can be detected, by conventional circuitry or by suitable microprocessor programming, to indicate forward tape movement. When chopper wheel 92 rotates in the counterclockwise direction, as when tape is rewound, pulse B leads pulse A. This leading relationship also can be detected by suitable means to represent the reverse movement of tape. Thus, chopper pulses are produced when chopper wheel 92 rotates in either direction, and the particular direction of rotation can be determined.

The chopper pulses, and direction of tape movement, are used to increment or decrement the aforementioned minutes counter. More particularly, each chopper pulse is supplied to a prescaler, which functions as a frequency divider, or pulse counter, having a programmable dividing, or counting, ratio. The purpose of such a prescaler now will be described. As mentioned above, when the magnetic tape is fully wound on the supply reel, the rotary speed of the take-up reel is a maximum because its diameter is a minimum. Consequently, if chopper wheel 92 is driven with the take-up reel, it rotates at its maximum speed. This means that, for a given time increment, such as 0.1 minutes, a larger predetermined number of chopper pulses, for example, 8 pulses, are generated. As tape continues to advance in the forward direction, the diameter of the take-up reel increases so as to decrease the rotary speed of the chopper wheel. Hence, for the same predetermined time increment, a lesser number of chopper pulses is generated. Thus, if eight chopper pulses had been counted previously to represent 0.1 minutes, then, at this increased speed, a lesser number of chopper pulses must be counted to represent 0.1 minutes. The function of the prescaler is to change the dividing ratio that is, the number of chopper pulses which must be counted to indicate 0.1 minutes, in accordance with the quantity of tape which has already been transported. Of course, if chopper wheel 92 is coupled to the supply wheel, then the converse of the foregoing must be carried out, that is, the dividing ratio of the prescaler must be increased as tape continues to be wound upon the take-up reel.

It has been found that the dividing ratio of the prescaler need not be varied continuously as tape advances. Rather, approximately the same number of chopper pulses is generated during every 0.1 minute increment over a predetermined length of tape. For example, the same number of chopper pulses is generated (e.g. 8) when the tape is advanced from its start position, corresponding to a recording time of 0 minutes, until a quantity of tape corresponding to 2.9 minutes of recording time has been reached. Then, the number of chopper pulses counted changes (e.g. to 7) for every 0.1 minute increment from the range of 3 minutes of recording time to 5.9 minutes of recording time. Further, changes in the dividing ratio of the prescaler occur for the ranges 6–10.9 minutes (e.g. to 6), 11–19.9 minutes (e.g. to 5), 20–33.9 minutes (e.g to 4) and 34–99.9 minutes (e.g. to 3). With these changes in the dividing ratio, the prescaler functions to generate output pulses at 0.1 minute increments, regardless of the quantity of tape which has been transported from the supply reel to the take-up reel. That is, these output pulses exhibit a linear relationship with respect to tape length (e.g. one pulse for every 0.1 minute increment).

Returning to FIG. 7, as each chopper pulse is read, inquiry is made is to whether the B-pulses lead the A-pulses (FIGS. 10B and 10A), representing the reverse movement of tape, and requiring the prescaler to be counted in the downward direction. If this inquiry is answered in the negative, then inquiry is made as to whether the B-pulses lag the A-pulses, as when tape is driven in the forward direction, thus requiring the prescaler to be counted in the upward direction. If this inquiry also is answered in the negative, then it is concluded that the tape is not being moved. However, if the prescaler should be counted in the upward direction, inquiry then is made as to whether the count then present in the minutes counter exceeds 49.9 minutes. For convenience, this count is selected as the maximum for controlling the dividing ratio of the prescaler. If it is assumed that the count then present in the minutes counter is less than 49.9 minutes, then the prescaler is incremented by unity. That is, if a chopper pulse is detected, the count of the prescaler is incremented.

Following the incrementing of the count of the prescaler, inquiry is made as to whether the instantaneous count now present therein exceeds the dividing ratio established by the minutes counter. From the foregoing ranges, it may be appreciated that, whenever the count of the minutes counter passes from one range to another, the dividing ratio for the prescaler likewise changes. At each increment of the prescaler, its count is compared to the preset dividing ratio corresponding to the present count of the minutes counter. For example, if the present count of the minutes counter is less than two minutes, the count of the prescaler is compared to a dividing ratio of 8. If the count of the prescaler is 8 or less, this inquiry is answered in the negative, and an "up-count" flag is set. However, if the count of the prescaler now is greater than a count of 8, this inquiry is answered in the affirmative so as to reset the prescaler to an initial count, such as a count of zero, and to increment the minutes counter by one. More particularly, the count representing the tenths of minutes is incremented by one. Then, the "up-count" flag is set. After the setting of this "up-count" flag, the microprocessor subroutine next inquires as to whether the count of the minutes counter exceeds 31 minutes.

In the foregoing description, it has been assumed that the tape is driven in the forward direction so as to require the prescaler to count in the upward direction. If it is assumed that the tape is driven in the reverse direction, then the inquiry as to whether the prescaler should be counted in the downward direction is answered in the affirmative. Accordingly, the prescaler is decremented by one count. Inquiry then is made as to whether a borrow operation must be performed. If the prescaler had been set to a count of zero and then decremented, such a borrow operation must be carried out. However, if the prescaler had been set to any other count, then the decrementing thereof would not entail a borrow operation. Assuming that a borrow operation is necessary, that is, the prescaler is decremented to a count less than zero, the minutes counter is decremented by one count. More particularly, the tenths of minutes count is decremented. If the decrementing of the minutes counter requires a borrow operation, that is, if the minutes count had been equal to "00.0" minutes, then the minutes counter is cleared. This is because it is preferred to prevent the minutes counter from exhibiting a count such as "99.9", which could be confusing to the user. However, if the count of the minutes counter had been greater than "00.0", then a borrow operation is not necessary; and the prescaler is reset to the dividing ratio now established by the minutes counter. For example, if the minutes counter had been decremented from a count of 3.0 minutes to a count of 2.9 minutes, the dividing ratio of the prescaler is reset to a dividing ratio equal to 8. Of course, if the count of the minutes counter has not been decremented so as to fall within another range, the existing dividing ratio of the prescaler is maintained. Then, following the resetting of the dividing ratio, or the clearing of the minutes counter, the "up-count" flag is reset and then inquiry is made as to whether the count of the minutes counter exceeds 31 minutes.

After the prescaler has been incremented or decremented, depending upon the direction in which the tape is transported, and following the incrementing or decrementing of the minutes counter, the "up-count" flag either is set, if tape is transported in the forward direction, or reset, if tape is being driven in the reverse direction. Then, inquiry is made as to whether the count then present in the minutes counter exceeds 31 minutes. If not, the minutes count (absent the tenths of minutes count) is loaded into the cursor register. Since the cursor register is used to energize a particular one of elements $25_L$, the count now transferred to the cursor register is seen to energize the one element which corresponds to the present position of the tape, this position being a function of recording time. Thus, if the count of the minutes counter remains at "00", element $25_{L0}$ is energized to provide the approximate cursor indication. If the count of the minutes counter has been incremented to a count of 01, 02, ... 31, then the corresponding element $25_{L1}$, $25_{L2}$, ... $25_{L31}$ is energized. It may be appreciated that the count representing tenths of minutes need not be loaded into the cursor register inasmuch as this tenths of minutes count does not affect the particular light indicating element which is energized. This is because the same element is energized for a particular minutes count regardless of the quantity of tenths or minutes.

However, if the inquiry as to whether the count of the minutes counter exceeds 31 minutes is answered in the affirmative, the cursor register is loaded to a count which corresponds to the right-most "letter" LED. That is, the count loaded into the cursor register is equal to a count of 31 so as to address element $25_{L31}$. Since only 32 LED's are provided in array $25_L$, it is preferred that, whenever the count of the minutes counter exceeds 31 minutes, only the right-most LED $25_{L31}$ be energized to provide the cursor indication. Then, after the cursor register is set to an appropriate count so as to energize the corresponding "letter" element to produce the cursor indication, inquiry is made as to whether the "transcribe flag" is set. This flag is set upon the completion of a scan operation. If the "transcribe flag" is set, then it is assumed that machine 10 is operating in a transcribe mode. Let it be assumed, for the purpose of the present discussion, that machine 10 is operating in a dictate, or record mode. Accordingly, the inquiry as to whether the "transcribe flag" is set is answered in the negative; and the microprocessor advances to the subroutine illustrated in FIG. 8.

Figure 8:
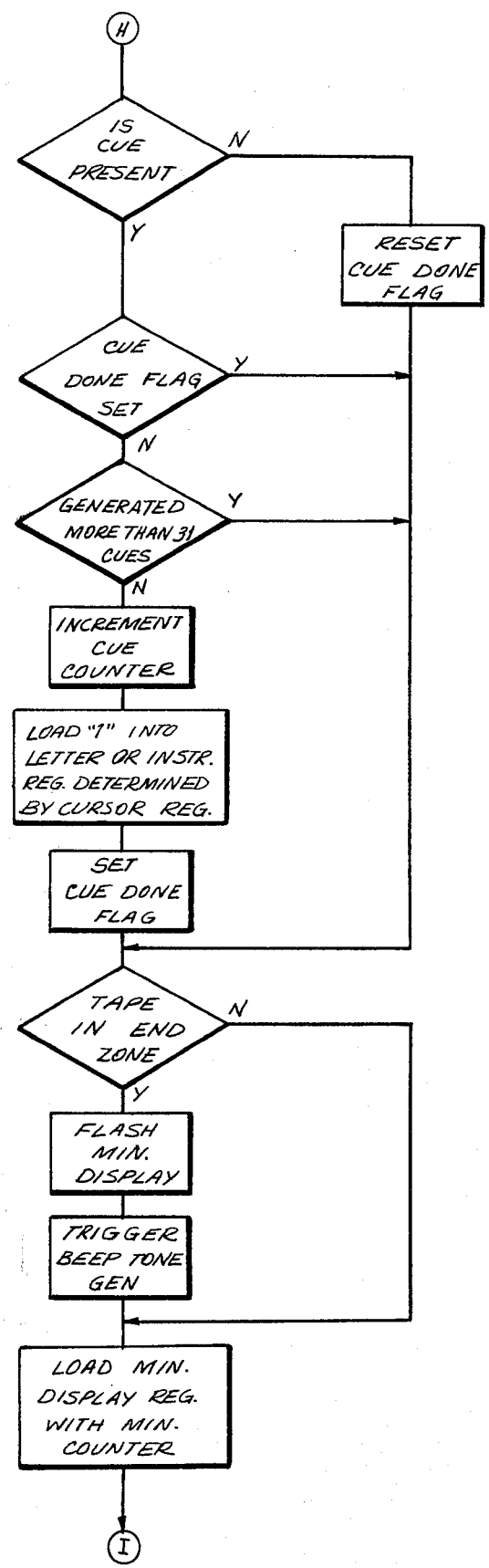

In the subroutine of FIG. 8, inquiry first is made as to whether a cue signal is present. It may be appreciated that, in the dictate, or record mode, a cue signal is present if cue signal recording switch 33, provided on microphone unit 12, is operated. This switch is operated to record a cue signal in the form of either a "letter" or "instruction" signal on the recording tape. If a cue signal is not present, the "cue done" flag is reset, and the subroutine advances to inquire whether the tape has been advanced to its "end zone". However, and as will be described, if a cue signal is present, then the contents of the cursor register, which has been set to the minutes count, is used to address a corresponding LED $25_L$ or $25_I$, depending upon whether a single burst of cue tone (i.e. the "letter" signal) or two bursts of cue tone (i.e. the "instruction" signal) is detected. Thus, the relative location whereat the letter or instruction signal is recorded is displayed.

Figure 11:
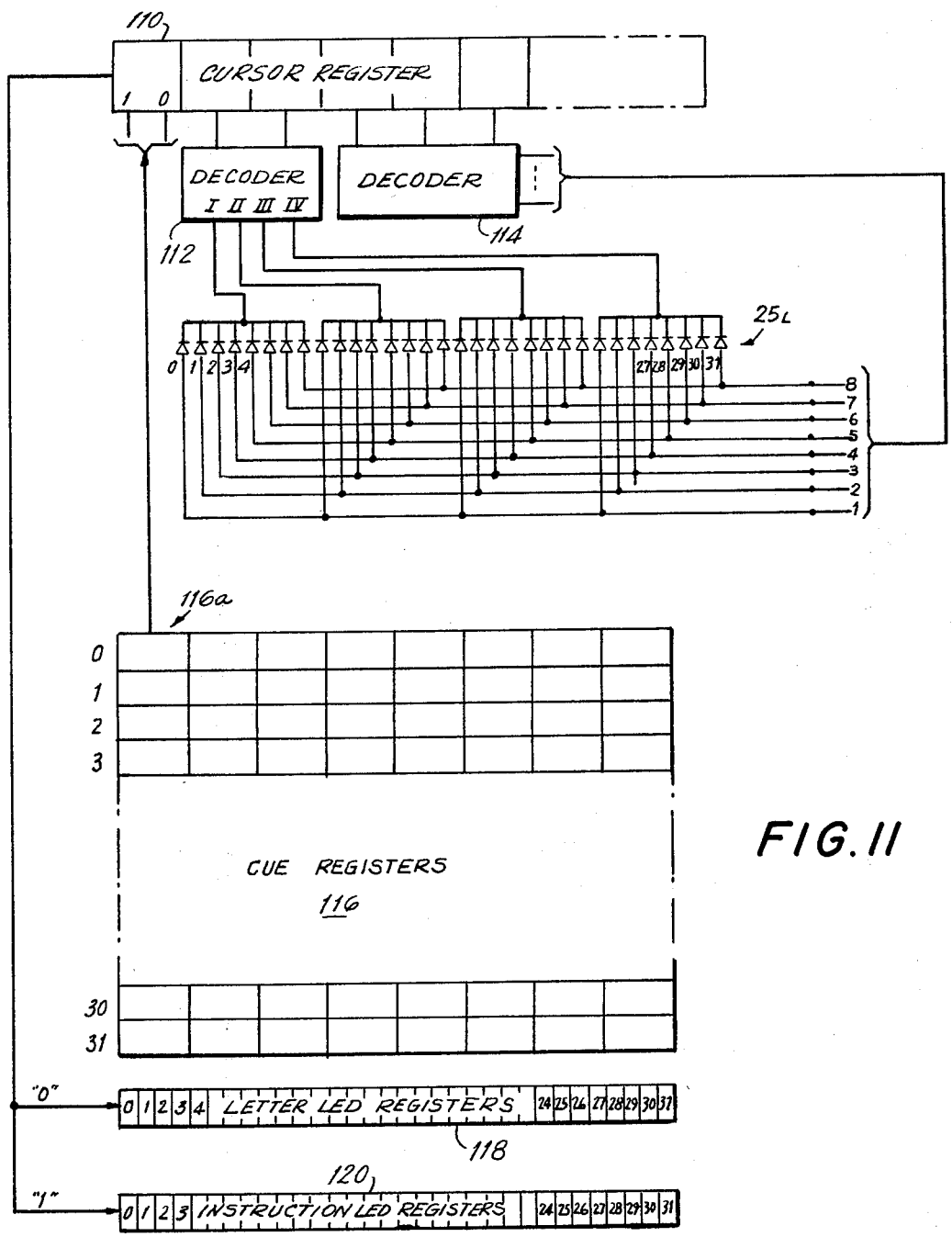
FIG. 11 is a block diagram of apparatus which can be used to energize the display of the present invention.

Diverting, for the moment, to FIG. 11, cursor register 110 is formed as a multi-stage register. One stage of cursor register 110 is adapted to store an identification bit, five stages of this register are adapted to store a 5-bit binary signal representing the minutes count (0, 1, . . . 31), and the remaining stages of this register are adapted to store the count representing tenths of minutes and, if desired, but not necessarily, the count of the prescaler. As will be described, the 5-bit minutes count stored in cursor register 110 is decoded by decoders 112 and 114 to energize one of the 32 elements $25_{L0}$, $25_{L1}$, . . . $25_{L31}$ which is addressed by, or corresponds to, this count.

FIG. 11 also illustrates "letter" LED registers 118 and "instruction" LED registers 120. A respective "letter" LED register is provided for each "letter" element $25_{L0}$, $25_{L1}$, . . . $25_{L31}$. Likewise, a respective "instruction" LED register is provided for each "instruction" element $25_{I0}$, $25_{I1}$, . . . $25_{I31}$. The contents of cursor register 110 address a corresponding "letter" or "instruction" LED register, depending upon whether the identification stage of the cursor register stores a "0" or "1" identification bit. It may be appreciated that the state of the identification bit is determined by the detected "letter" or "instruction" signal. For example, let it be assumed that cursor register 110 is provided with a binary "0" identification bit, together with a minutes count "0.3.X", wherein "X" is any arbitrary tenths of minutes count. The identification bit is loaded into "letter" LED register #3 as a binary "1" and is loaded into "instruction" LED register #3 as a binary "0". If the register has a binary "1" identification bit together with a minutes count "15.X" data stored therein, "letter" register #15 is supplied with a binary "0"; and "instruction" LED register #15 is supplied with a binary "1". It is appreciated that each "letter" LED register and each "instruction" LED register serves to energize a respective one of the "letter" and "instruction" elements. In the foregoing example, "letter" element $25_{L3}$ is energized by the binary "1" stored in "letter" LED register #3; and "instruction" element $25_{I15}$ is energized by the binary "1" stored in "instruction" LED register #15. The energized elements provide an indication of the locations along the recording tape at which "letter" and "instruction" signals are recorded during the dictate mode of operation.

FIG. 11 also illustrates the preferred manner in which a particular LED is energized by the minutes count of cursor register 110 to provide a cursor indication. Elements $25_L$ are divided into four groups, comprised of Group I constituted by elements $25_{L0}$–$25_{L7}$, Group II constituted by elements $25_{L8}$–$25_{L15}$, Group III constituted by elements $25_{L16}$–$25_{L23}$, and Group IV constituted by elements $25_{L24}$–$25_{L31}$. Thus, it is appreciated that each group of elements is constituted by eight individual elements. Respective elements in each group are connected in common to form eight segments. Thus, elements $25_{L0}$, $25_{L8}$, $25_{L16}$ and $25_{L24}$ are connected in common as segment 1. Elements $25_{L1}$, $25_{L9}$, $25_{L17}$ and $25_{L25}$ are connected in common as segment 2. The remaining elements are similarly connected, whereby elements $25_{L7}$, $25_{L15}$, $25_{L23}$ and $25_{L31}$ are connected in common as segment 8.

The two most significant bits of the minutes count included in cursor register 110 are decoded so as to energize a respective one of Groups I, II, III and IV. The three least significant bits of the minutes count included in cursor register 110 are decoded by decoder 114 to produce a respective segment select signal so as to select one of segments 1, 2, . . . 8. The particular elements $25_{L0}$, . . . $25_{L31}$ which is defined by the selected group and selected segment is energized to provide the cursor indication. Although not shown in FIG. 11, a suitable flashing circuit may be provided so as to flash the selected element, thereby providing the aforementioned cursor indication. Of course, as the minutes count stored in cursor register 110 is incremented or decremented, a corresponding shift in the energized element indicates a corresponding movement of the tape. That is, as the tape advances by a length equal to one minute of recording time, the cursor indication shifts to the next adjacent element in a left-to-right direction. Conversely, if the tape is rewound by a length corresponding to one minute of recording time, the cursor indication is shifted to the left by one element. It may be appreciated that, since the particular element which is selected by decoders 112 and 114 is independent of the tenths of minutes count, a shift to the right is obtained when the minutes count changes from "15.9" to "16.0", for example. Similarly, a shift to the left obtains if the minutes count changes from "09.0" to "08.9", for example. This is because it is minutes count, notwithstanding the tenths of minutes count, that determines the particular element to be energized.

Returning to the flow chart shown in FIG. 8, if the inquiry of whether a cue signal is present is answered in the affirmative, inquiry next is made as to whether the "cue done" flag has been set. If it is assumed that the presence of a cue signal first is detected, then this inquiry is answered in the negative. Inquiry next is made as to whether more than thirty-one cue signals have been generated. Since only a limited number of light elements is provided, it is preferred that a maximum of thirty-one cue signals be capable of detection. If less than thirty-one cue signals have been generated, a cue counter is incremented, and the identification bit which has been stored in, for example, the first stage of cursor register 110, is used to load a binary "1" into the corresponding "letter" or "instruction" LED register. Then, the "cue done" flag is set.

Inquiry next is made as to whether the tape has been advanced to its "end zone". For the purpose of the present description, the "end zone" of the tape is defined as a predetermined length of tape which remains available for recording. This predetermined length may be equal to a recording time of about three minutes. Since the rotary speed of chopper wheel 92 is a function of the amount of tape remaining on the supply reel, the entry of the tape into its "end zone" may be determined by sensing the frequency, or period, of the chopper pulses. If it is determined that the tape has been advanced to its "end zone", minutes display 26 is flashed at a predetermined rate and, moreover, a suitable warning tone generator, referred to in the flow chart of FIG. 8 as a "beep tone" generator is triggered. As an example, minutes display 26 may be flashed every two seconds, and a warning tone may be generated every 15 seconds. Of course, if it is determined that the tape has not been advanced to its "end zone", this end zone warning is by-passed. In either event, a minutes display register now is loaded with the contents of the minutes counter, including the count representing tens, units and tenths of minutes. This display register is used to drive the 7-segment displays which comprise minutes display 26.

Hence, the minutes count, which have been incremented or decremented in response to the generated chopper pulses, now is displayed. It is appreciated that the operation of the prescaler functions to "linearize" the relationship between the generated chopper pulses and the contents of the minutes counter such that an accurate display of consumed recording tape is provided. Thus, regardless of the amount of tape which remains on the supply reel, minutes display 26 provides an accurate indication of the length of tape, in terms of recording time, that has been transported.

After the minutes display register has been loaded with the contents of the minutes counter, the microprocessor advances to the hold subroutine illustrated in FIG. 2 and described hereinabove. Then, the foregoing operation is repeated. Thus, as the tape is transported, chopper pulses are generated, the prescaler is incremented or decremented, and the minutes counter likewise is incremented or decremented after the prescaler has divided the number of chopper pulses by the dividing ratio established by the instantaneous count of the minutes counter. The minutes counter is loaded into the cursor register such that, as the contents of the minutes counter changes, the cursor indication likewise is shifted. Furthermore, if a cue signal is generated, the appropriate "letter" or "instruction" element corresponding to the present position of the tape, as represented by the contents of the cursor register, is energized to provide a suitable indication of the location on the record tape at which the "letter" or "instruction" cue signal is recorded. Furthermore, as the tape is transported, minutes display 26 displays the quantity of tape, in terms of recording time, that has been consumed. This also provides an indication of the present position of the tape.

The foregoing has described the manner in which the microprocessor controls displays 24 and 26 during a dictate, or record mode of operation. This microprocessor implementation may, alternatively, be replaced by discrete circuitry, one embodiment of which is illustrated in the block diagram shown in FIG. 12. This Figure illustrates apparatus which may be used during dictate operations as well as during transcribe operations. Such apparatus now will be described with reference to a dictate operation.

The apparatus shown in FIG. 12, which is relevant to the present discussion, includes a decoder 122, prescaler 124, a comparator 126, minutes counter 128, a dividing ratio selector circuit 130 and minutes display register 134. Decoder 122 is supplied with chopper pulses which, as described above, may be similar to the pulses shown in FIGS. 10D and 10E, and decodes these pulses to determine the direction in which the tape is moving. For forward movement, the chopper pulses are supplied from decoder 122 to prescaler 124 as "count-up" pulses; whereas for reverse movement, the chopper pulses are supplied to the prescaler as "count-down" pulses. As successive chopper pulses are supplied to the prescaler, the count therein is incremented or decremented accordingly. The instantaneous count of prescaler 124 is compared in comparator 126 to a preselected dividing ratio. This dividing ratio is supplied to comparator 126 by dividing ratio selector circuit 130 and is a function of the contents of minutes counter 128. As mentioned above, and as one example thereof, if the contents of minutes counter 128 is within the range 0 to 2.9, then a dividing ratio of, for example, 8 is selected and supplied, in suitably coded form, to comparator 126. If the contents of minutes counter 128 is within the range 3 to 5.9, then another dividing ratio is selected and supplied to the comparator. Likewise, respective dividing ratios are selected and supplied to comparator 126 if the contents of minutes counter 128 is within the range 6 to 10.9, 11 to 19.9, 20 to 33.9 and 34 to 99.9.

The selected dividing ratio is compared to the instantaneous count of prescaler 124. When the count of the prescaler is equal to the selected dividing ratio, comparator 126 produces an output to reset the prescaler to an initial count, such as a count of zero, and to increment minutes counter 128. In particular, this output signal produced by the comparator serves to increment the tenths of minutes count. Then, depending upon the count now present in minutes counter 128, either the same or a different dividing ratio is selected. Subsequent chopper pulses increment the count of prescaler 124, and each count therein is compared to the selected dividing ratio in the aforedescribed manner. Thus, as prescaler 124 is incremented to a count equal to the selected dividing ratio, minutes counter 128 is incremented.

As one example, let it be assumed that chopper wheel 92 is coupled to the take-up reel such that the frequency of the chopper pulses supplied to prescaler 124 decreases as the take-up reel diameter increases. Initially, that is, with the tape fully wound upon the supply reel, minutes counter 128 is provided with a count of "00.0" minutes. This count selects a dividing ratio of 8. Thus, after prescaler 124 has been incremented to a count of 8, that is, after eight chopper pulses have been counted, comparator 126 produces an output signal to reset the prescaler and to increment minutes counter 128 so as to exhibit a count of "00.1". This process continues until a length of tape equal to three minutes of recording time has been transported from the supply reel to the take-up reel. When minutes counter 128 has been incremented to a count of "03.0", dividing ratio selector circuit 130 selects a dividing ratio of 7. Prescaler 124 now is incremented to a count of 7 such that, after every seven chopper pulses have been counted, the prescaler is reset and minutes counter 128 is incremented. Thus, it is seen that, even though the rotary speed of the take-up reel decreases as a greater quantity of tape is wound thereon, minutes counter 128 nevertheless is incremented in a linear manner so as to provide an accurate representation of the quantity of tape which has been transported.

It has been assumed that machine 10 operates in its dictate or record mode. Hence, the "transcribe flag" is not set, as represented by a binary "1" level for the signal transcribe. As shown in FIG. 12, this transcribe signal is supplied to an AND gate 132, thereby enabling this AND gate to supply the minutes count of minutes counter 128 to minutes display register 134. Consequently, minutes display 26 is energized to display the tens, units and tenths of minutes count which has been transferred to the minutes display register. The user thus is provided with an accurate display of the quantity of tape, in terms of recording time, which has been consumed. It may be appreciated that, if desired, minutes counter 128 may be decremented from a maximum of count of "30.0" as tape is driven in the forward direction, such that minutes display register 134 is provided with a count representing the quantity of tape which is available for recording.

The remaining apparatus illustrated in FIG. 12 is adapted for use during a transcribe operation, and will be described in greater detail hereinbelow.

Returning to the flow chart shown in FIG. 3, the preceding discussion followed from the assumption that either the "scan disable" flag had been set, or that SCAN switch 60 had not been activated. Let it now be assumed that the "scan disable" flag is not set; but that SCAN switch 60 now is activated. Proceeding with the flow chart shown in FIG. 3, a predetermined count is loaded into a cue register that is associated with the right-most pair of elements $25_{L31}$ and $25_{I31}$. This predetermined count is represented as [01111111]. With reference to FIG. 11, cue registers 116 are illustrated as thirty-two individual multi-stage storage registers. During this scan operation, each of cue registers 116 is associated with a respective pair of "letter" and "instruction" elements. Thus, cue register #0 is associated with elements $25_{L0}$ and $25_{I0}$, cue register #1 is associated with elements $25_{L1}$ and $25_{I1}$, and so on, with cue register #31 being associated with elements $25_{L31}$ and $25_{I31}$. Each cue register 116 includes a stage 116a adapted to store an identification bit in accordance with the particular cue signal which is detected while the tape is scanned. The remaining stages of each cue register are adapted to store the contents of a chopper pulse counter (not shown) when the respective cue register is addressed as will be described.

Returning to the flow chart of FIG. 3, the predetermined count [01111111] is loaded into cue register #31 with the binary "0" being loaded as the identification bit into stage 116a of this cue register. Then, the cursor register is set to address the right-most element. With reference again to FIG. 11, the 5-bit minutes count of cursor register 110 thus is set to the count of [11111], thereby addressing element $25_{L31}$. The aforementioned chopper pulse counter now is preset to a maximum count which, for the purpose of the present discussion, is assumed to be [11111111]. A binary "1" then is loaded into the "letter" LED register now addressed by the cursor register. Since the cursor register has been set to address element $25_{L31}$, this binary "1" is loaded into "letter" LED register #31. Then, the minutes display register, such as minutes display register 134 (FIG. 12) is loaded with a particular digital signal whereby the 7-segment displays constituting minutes display 26 are selectively energized to display the message "Scn". This provides the user with an indication that machine 10 has been disposed in its scan mode.

Figure 13A:
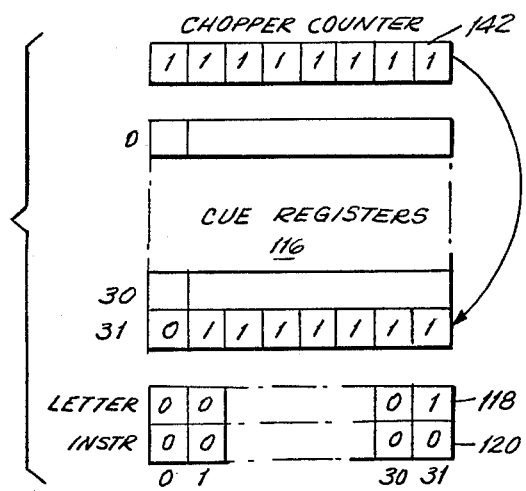
FIGS. 13A–13C are useful in understanding the operation during a scan mode.

The conditions established by the chopper pulse counter, cue registers and "letter" LED registers are depicted in FIG. 13A. Thus, chopper pulse counter 142 is preset with the count [11111111]; cue register #31 is loaded with a binary "0" identification bit together with those bits of greater significance of chopper pulse counter 142; and "letter" LED register #31 is loaded with a binary "1".

Since the cursor register stores the address of "letter" element $25_{L31}$, this element is flashed to provide a cursor indication. This cursor indication is superimposed upon the energization of this same element, which energization is obtained by the binary "1" stored in "letter" LED register #31.

Continuing with the flow chart shown in FIG. 3, after the minutes display register is set to display the message "Scn", chopper pulses are read. Inquiry is made as to whether each chopper pulse is generated as a function of the reverse movement of the tape which would require the chopper pulse counter to count in the downward direction. It is recalled that, in the scan mode of operation, the tape is rewound from its arbitrary present position back to its beginning portion and, during this reverse movement, cue signals recorded on the tape are detected. Hence, it is expected that, since SCAN switch 60 has been activated, the inquiry as to whether the chopper pulse counter should count in the downward direction will be answered in the affirmative. Then, the count of chopper pulse counter 142 is decremented by one count. Thus, the count then present in the chopper pulse counter will appear as [11111110].

Figure 4:
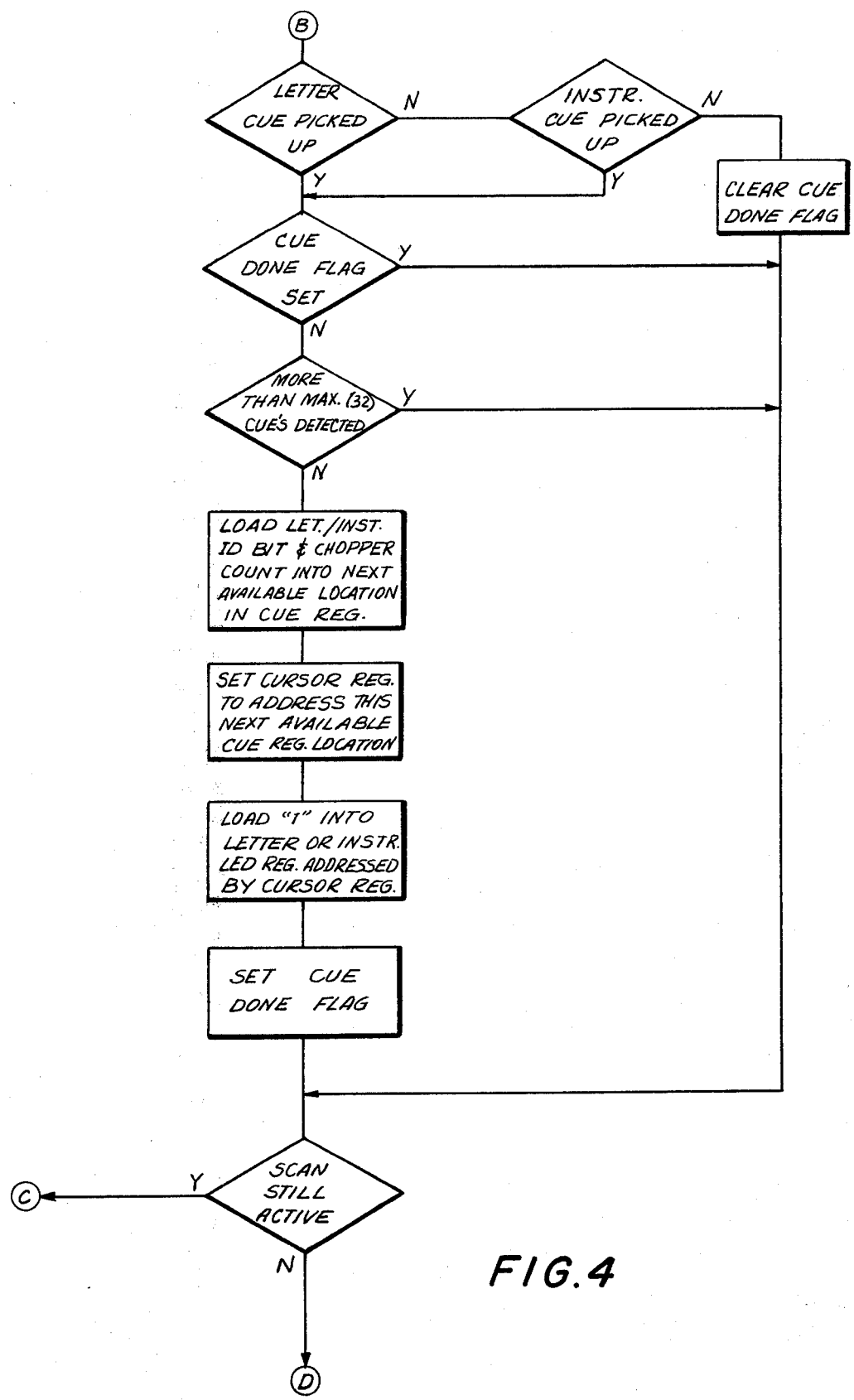

After decrementing the chopper pulse counter by one, the microprocessor advances to the flow chart shown in FIG. 4 wherein inquiry is made as to whether a "letter" cue signal has been detected from the recording tape. If this inquiry is answered in the negative, inquiry next is made as to whether an "instruction" cue signal has been detected. If this inquiry also is answered in the negative, the "cue done" flag is cleared, and the subroutine advances to inquire whether SCAN switch 60 remains activated. If so, the microprocessor returns to the point shown in FIG. 3 wherein chopper pulses are read. The subroutine continues to cycle through this loop, whereupon the count of chopper pulse counter 142 is decremented successively as the tape is rewound.

Figure 13B:
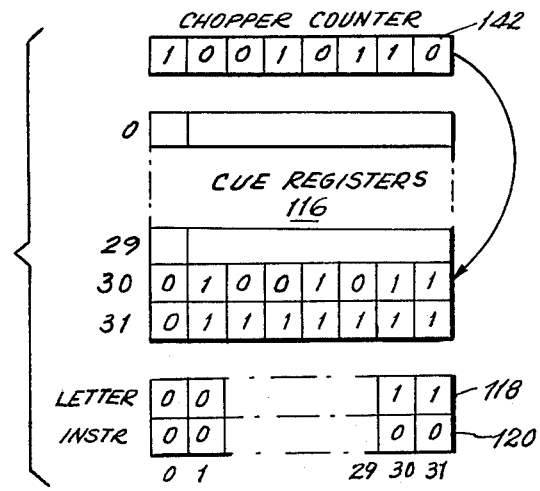

Let it be assumed that, during this scanning of the tape, a "letter" or "instruction" cue signal is detected. Upon the detection of this cue signal, inquiry is made as to whether the "cue done" flag is set. In the present example, it is assumed that the cue signal has just been detected and, consequently, this inquiry is answered in the negative. Inquiry then is made as to whether more than a maximum number of cue signals (e.g. 32 cue signals) had been detected. In accordance with the assumption made hereinabove, since only 32 pairs of elements are provided in index/instruction display 24, and since a separate cue register is provided for each pair, these cue registers may accommodate the detection of only 32 cue signals. If this inquiry is answered in the negative, the appropriate "letter" or "instruction" identification bit, depending upon whether a "letter" or "instruction" signal has been detected, is loaded into the next available cue register, that is, into cue register #30. Also, the chopper count then present in chopper pulse counter 142 likewise is loaded into cue register #30. If it is assumed that a "letter" signal is detected at the time that the count of chopper pulse counter 142 is [10010110], as shown in FIG. 13B, then a binary "0" is loaded as the identification bit into stage 116a of cue register #30, and the bits of greater significance [1001011] are loaded into the remaining stages of this cue register.

Then, continuing with the flow chart shown in FIG. 4, the cursor register is set to address the element associated with this cue register #30. That is, the 5-bit count loaded into cursor register 110 is a binary count equal to 30. Hence, "letter" element $25_{L30}$ now is flashed to provide a cursor indication. Also, since cue register #30 is provided with a binary "0" identification bit, "letter" LED register #30 is loaded with a binary "1" to represent the detection of a "letter" signal. It may be appreciated that, if an "instruction" signal had been detected, stage 116a of cue register #30 would be provided with a binary "1"; and "instruction" LED register #30 would be loaded with a binary "1" to energize "instruction" element $25_{I30}$.

After the appropriate "letter" or "instruction" LED register is loaded with a binary "1", the "cue done" flag is set. By setting this flag, the next time that this same cue signal is detected during the immediately following cycle of this subroutine, the duplicate loading of the cue register and "letter" or "instruction" LED register is by-passed. That is, although the inquiry as to whether a "letter" or "instruction" cue signal is detected is answered in the affirmative, because the very same cue signal is in the process of being detected, the inquiry as to whether the "cue done" flag has been set also is answered in the affirmative.

After the "cue done" flag is set, inquiry is made as to whether SCAN switch 60 still is activated. If so, the subroutine returns to the point shown in FIG. 3 wherein chopper pulses are read once again, and the subroutine continues to cycle through the indicated loop. If, during the next cycle through this loop, neither a "letter" nor an "instruction" signal is detected, the "cue done" flag is cleared.

Figure 13C:
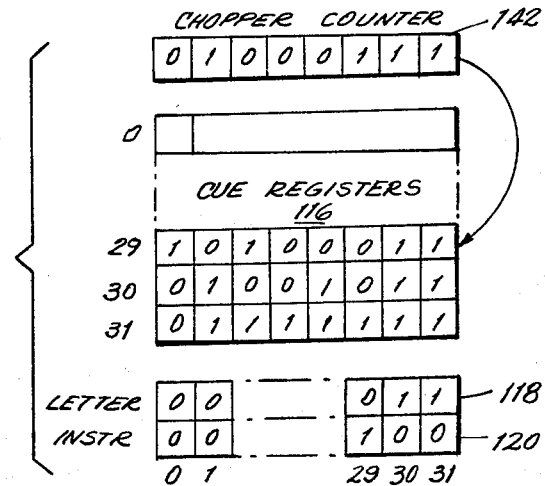

Let it be assumed that, while cycling through this loop, another cue signal is detected. Let it be further assumed that this cue signal is an "instruction" signal. Continuing with the flow chart shown in FIG. 4, the inquiry as to whether a "letter" cue signal has been detected is answered in the negative, but the inquiry as to whether an "instruction" cue signal has been detected is answered in the affirmative. Next, inquiry is made as to whether the "cue done" flag has been set. It is recalled that this flag has been reset and, therefore, this inquiry is answered in the negative. The next-following inquiry as to whether more than the maximum number of cue signals has been detected also is answered in the negative. Then, since it is assumed that an "instruction" signal has been detected, a binary "1" identification bit, representing this "instruction" signal, is loaded into stage 116a of the next-available cue register #29. Also, the chopper count then present in chopper pulse counter 142 is loaded into cue register #29. As shown in FIG. 13C, it is assumed that this chopper count is [01000111], and only the bits of greater significance [0100011] are loaded into cue register #29.

Next, cursor register 110 is set to an address count [11101] corresponding to the element associated with cue register #29. Consequently, element $25_{L29}$ is energized to provide a cursor indication. Then, the binary "1" identification bit in stage 116a of cue register #29 is supplied as a binary "1" into "instruction" LED register #29. That is, this binary "1" is loaded into the "instruction" LED register then being addressed by the count [11101] which has been set in cursor register 110. Hence, element $25_{I29}$ is energized to indicate the detection of an "instruction" signal. Next, the "cue done" flag is set, and then inquiry again is made as to whether SCAN switch 60 remains activated.

The foregoing cycle of operation continues as the microprocessor advances through the flow charts shown in FIGS. 3 and 4. It is appreciated that, as the tape is rewound, the count in chopper pulse counter 142 is decremented. Furthermore, if a cue signal is detected while the tape is being scanned, the count then present in the chopper pulse counter at the time that the cue signal has been detected is loaded into the next available cue register, together with an appropriate identification bit to identify whether the detected cue signal represents a "letter" or an "instruction". Then as successive cue registers are loaded with data, the cursor register is decremented to address the elements associated with such cue registers. Hence, the corresponding "letter" element is flashed as a function of the count of this cursor register. Also, depending upon whether each detected cue signal represents a "letter" or an "instruction", the next "letter" or "instruction" element is energized.

It is appreciated that, during this scan operation, successive elements are energized merely to indicate the number and type of cue signals which have been detected, but such energized elements do not provide an indication of the location of such cue signals on the recording tape.

Let it now be assumed that the magnetic tape has been rewound to its beginning. This resets a "scan" flag such that, as the microprocessor cycles through the loop discussed hereinabove, the inquiry as to whether SCAN switch 60 remains activated now will be answered in the negative. Accordingly, the microprocessor advances to the subroutine illustrated in FIG. 5.

Figure 5:
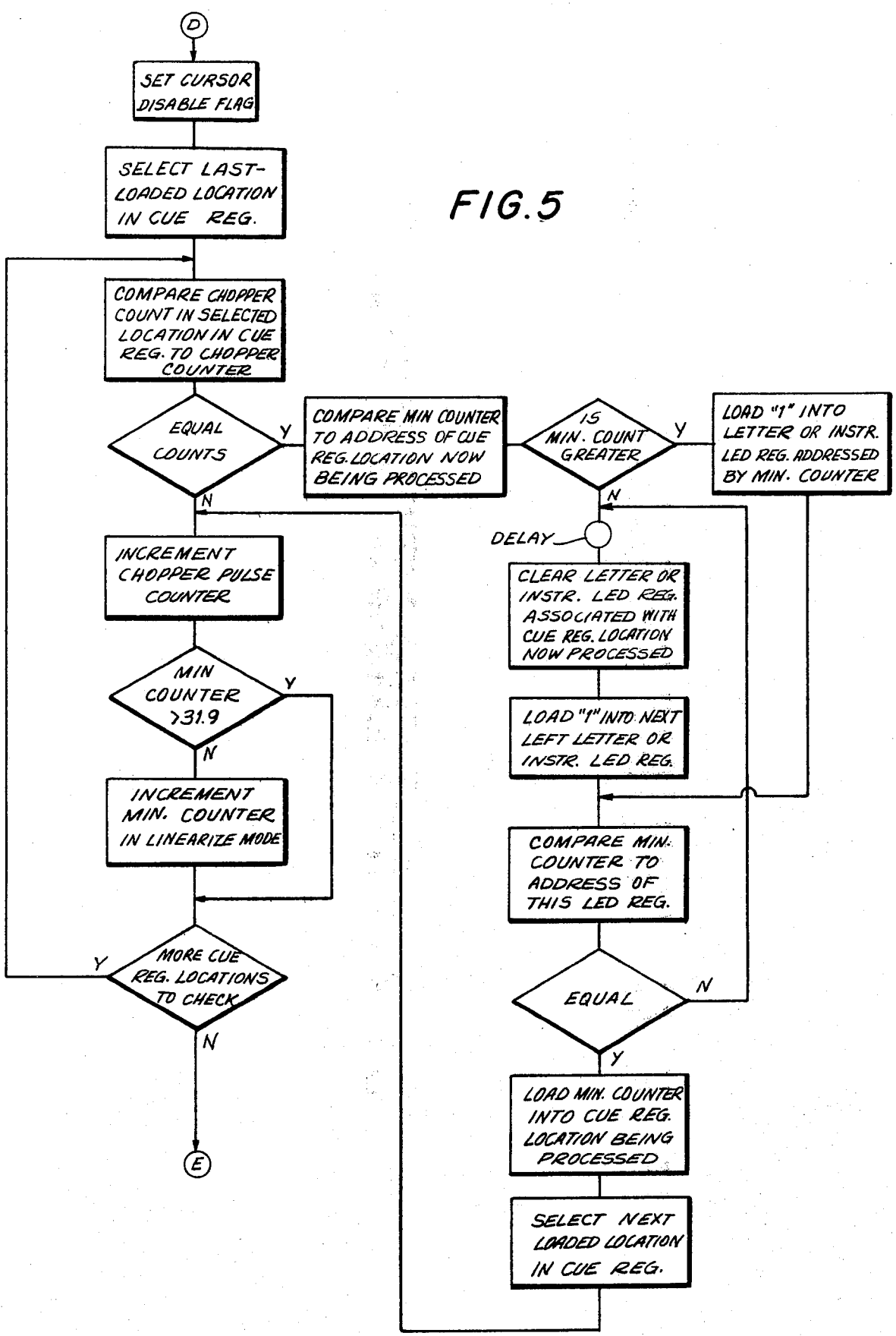
FIG. 5 is a flow chart of the operation that is carried out at the completion of a scanning operation.

As shown in FIG. 5, a "cursor disable" flag is set. The purpose of this flag is to inhibit a cursor indication while the following subroutine is executed. Next, the last-loaded location in cue registers 116 is selected. That is, as in accordance with the previous discussion, if it is assumed that cue register #29 is the last register into which data had been loaded, as shown in FIG. 13C, then this cue register #29 now is selected.

Then, the count present in chopper pulse counter 142 is compared to the count stored in the selected cue register. That is, the present chopper count is compared to the count stored in cue register #29. Let it be assumed that the present chopper count is equal to a count of [00111010]. It is seen, from FIG. 13C, that the chopper count stored in cue register #29 is equal to [0100011]. Inquiry then is made as to whether this comparison results in equal counts. In accordance with the present assumption, the chopper count is substantially less than the count stored in cue register #29. This is because, and in accordance with the foregoing discussion, the tape was further rewound during the scan operation, following the loading of the chopper count into cue register #29. Since this inquiry is answered in the negative, the chopper pulse counter now is incremented by one count. Following this incrementing of the chopper pulse counter, inquiry is made as to whether the count present in the minutes counter exceeds 31.9 minutes. Consistent with the present example, it has been assumed that the count present in the minutes counter is equal to "00.0". Thus, this inquiry is answered in the negative; and then the minutes counter is incremented in the linearized manner discussed hereinabove with respect to the flow chart shown in FIG. 7. That is, in addition to incrementing the chopper pulse counter, the prescaler also is incremented by one count; then, inquiry is made as to whether the count present in the prescaler exceeds the dividing ratio established by the count present in the minutes counter and, if so, the prescaler is reset and the minutes counter is incremented. Since this operation has been discussed in detail above, further description is not provided.

After incrementing the minutes counter in the linearized manner, inquiry is made as to whether all of the cue register locations have been taken into account. That is, inquiry is made as to whether the chopper count which had been stored in the last cue register location, that is, cue register #31, now is equal to the count in the chopper pulse counter. Assuming that the last cue register has not yet been checked, the microprocessor continues to cycle through the illustrated loop. Thus, after the chopper pulse counter has been incremented by one count, this updated count is compared to the count present in cue register #29 until, ultimately, these counts are equal. This operation can be carried out by apparatus similar to that illustrated in FIG. 14, wherein a comparator 146 compares the updated count of chopper pulse counter 142 to the count present in cue register #29. A chopper pulse simulator 148, which may be a pulse generator, is shown as being triggered by comparator 146, following such comparison operation, to generate simulated chopper pulses. In addition to updating the count of chopper pulse counter 142, the simulated chopper pulses generated by chopper pulse simulator 148 also are supplied to prescaler 124 so as to update the count present in this prescaler. As shown in FIG. 12, each updated count of prescaler 124 is compared to the dividing ratio selected by dividing ratio selector circuit 130 in response to the instantaneous count of minutes counter 128. Each time that the count of the prescaler is equal to the selected dividing ratio, comparator 126 resets the prescaler and increments the count (particularly, the tenths of minutes count) of minutes counter 128.

It is appreciated that the count present in chopper pulse counter 142 is incremented from its count [00111010] and, concurrently, the count of minutes counter 128 is incremented in the linearized manner discussed above. Ultimately, the count of the chopper pulse counter will attain a count such that the bits of greater significance thereof will be equal to the count [0100011] stored in cue register #29. At that time, the inquiry as to whether these respective counts are equal is answered in the affirmative. Then, the instantaneous count present in the minutes counter is compared to the address of the particular cue register location now being processed. That is, the instantaneous count of the minutes counter is sensed to determine if it is equal to, greater or less than a count of "29". Inquiry is made as to whether this minutes count is greater than the address of the cue register now being processed. If so, a binary "1" is loaded into the "letter" or "instruction" LED register now addressed by the minutes counter, the particular register being determined by the identification bit stored in the cue register. Normally, this inquiry is answered in the negative. That is, during normal operation, the instantaneous count of the minutes counter will be less than the address of the cue register now being processed. As a numerical example, at the time that the chopper count is incremented so as to be equal to the count stored in cue register #29, let it be assumed that the minutes counter has been incremented to a count of "02.X", where, as before, X represents an arbitrary tenths of minutes count. Quite obviously, cue register address "29" is greater than this minutes count of "02". Proceeding with the flow chart shown in FIG. 5, after a suitable delay (which is provided for a visual effect as will become apparent), the "letter" or "instruction" LED register associated with this cue register location now being processed is cleared. Since cue register #29 stored a binary "1" identification bit, it is recognized that "instruction" LED register #29 now is cleared.

Following this clearing of "instruction" LED register #29, a binary "1" is loaded into the next left "instruction" LED register, that is, a binary "1" is loaded into "instruction" LED register #28. Next, the minutes count now exhibited by the minutes counter is compared to the address of this "instruction" LED register. More particularly, the minutes count "02" is compared to address #28 of this "instruction" LED register. The inquiry as to whether the minutes count is equal to the address of this LED register is answered in the negative; so that after the aforementioned delay, this "instruction" LED register #28 now is cleared. Then, a binary "1" is loaded into the next left "instruction" LED register #27; and the address of this LED register is compared to the count "02" of the minutes counter. Since the minutes count is not equal to this LED register address, the foregoing operation continues, whereby a binary "1" is shifted from one "instruction" LED register to the next until, ultimately, the binary "1" is shifted into "instruction" LED register #2. In view of the high operating speed of the microprocessor, it is appreciated that the aforementioned delay permits visual perception of this shifting operation.

When the binary "1" ultimately is shifted into the "instruction" LED register whose address is equal to the count of the minutes counter, this minutes count (consisting of a tens, units and tenths of minutes count) is loaded into the cue register location being processed. In accordance with the present example, the minutes count "02.X" is loaded into cue register #29 to replace the chopper count previously stored therein. Then, the next-loaded location in the cue register is selected. More particularly, since cue register #29 has just been processed, cue register #30 now is selected.

It is appreciated that, as a binary "1" is shifted from "instruction" LED register #29 in the leftward direction until "instruction" LED register #2 is reached, "instruction" elements $25_I$ are sequentially energized to depict this shifting operation. That is, elements $25_{I29}, \ldots 25_{I02}$ are energized in sequence. Since the binary "1" ultimately is stored in "instruction" LED register #2, the corresponding element $25_{I02}$ remains energized to depict the location along the tape at which the "instruction" signal had been recorded.

After the next-loaded location in the cue register is selected, that is, after cue register #30 is selected, the chopper pulse counter is incremented, and then inquiry is made as to whether the count then present in the minutes counter exceeds "31.9". It is appreciated that this inquiry is answered in the negative and, accordingly, the minutes counter is incremented in the linearized manner, discussed above. Then, inquiry is made as to whether there are more cue register locations which must be checked. Since cue register #31 has not yet been processed, this inquiry is answered in the affirmative, and the microprocessor continues through the loop illustrated in FIG. 5.

The chopper count stored in cue register #30, that is, chopper count [1001011] now is compared to the instantaneous chopper count, that is, chopper count [01000111]. Since these counts are not equal, the chopper pulse counter is incremented, to a count of 801001000] and, since the minutes count does not exceed "31.9", the minutes counter continues to be incremented in the linearized manner. That is, the chopper pulse counter is incremented successively and, as shown in FIG. 14, each time that the chopper pulse counter is incremented, the prescaler also is incremented. As discussed above, when the count of the prescaler is incremented so as to be equal to the dividing ratio selected by the count then present in minutes counter 128 (FIG. 12), the prescaler is reset and the minutes counter is incremented.

Thus, the chopper pulse counter continues to be incremented until, ultimately, it obtains a count whose bits of greater significance are equal to [1001011], the very same count which is stored in cue register #30. When the chopper pulse counter is incremented to this count, the inquiry of whether the chopper count is equal to the count stored in the cue register now being processed is answered in the affirmative. The minutes count obtained by the minutes counter at the time that the chopper pulse counter had been incremented to this count now is compared to the address of cue register #30. Let it be assumed that, as the chopper pulse counter was incremented, minutes count 128, shown in FIG. 12, likewise was incremented so as to exhibit a count of "14.X".

Since the count of the minutes counter is not greater than the address of the cue register now being processed, i.e., cue register #30, the "letter" LED register #30, associated with this cue register, is cleared. It may be appreciated that, in this instance, it is the "letter" register that is cleared because the identification bit stored in stage 116a of cue register #30 is a binary "0". Then, after "letter" LED register #30 is cleared, a binary "1" is loaded into the next-left "letter" LED register #29. The count "14" of the minutes counter now is compared to this address of "letter" LED register #29 and, since these are not equal, following the aforementioned delay the binary "1" is shifted left by one register to "letter" LED register #28. This leftward shifting of the binary "1" continues until it is shifted into "letter" LED register #14. At that time, the address of this "letter" LED register is equal to the count stored in the minutes counter, so that the contents of the minutes counter is loaded into cue register #30, that is, the cue register being processed, to replace the chopper count previously stored therein.

After the minutes count "14.X" is loaded into cue register #30, the next-loaded location of the cue registers, that is, cue register #31, is selected. Then, the count of the chopper pulse counter, which had been equal to [10010110] is incremented and the foregoing operation is repeated. That is, the chopper pulse counter is incremented. Its count is compared to the count stored in cue register #31, and if these counts are not equal the chopper count again is incremented. As the chopper pulse counter is incremented, the prescaler also is incremented, as depicted in FIG. 14.

From the preceding discussion, and as shown in FIG. 12, minutes counter 128 is incremented whenever prescaler 124 reaches the count corresponding to the dividing ratio selected by the instantaneous count of the minutes counter. Thus, as the chopper pulse counter is incremented, the minutes counter also is incremented in a linearized manner. Ultimately, the count of the chopper pulse counter will be incremented to its maximum count [11111111]. As shown in FIG. 13A, this count is equal to the count stored in cue register #31. Then, the binary "1" stored in "letter" LED register #31 is shifted sequentially until it is loaded into that "letter" LED register which is addressed by the count of the minutes counter. This final location of the binary "1" represents, in terms of time, the overall quantity of tape upon which information had been dictated. For purposes of explanation, let it be assumed that this final location is "letter" LED register #23. At this time, the count exhibited by the minutes counter is equal to "23.X"; and this count is loaded into cue register #31 to replace the chopper count previously stored therein.

It is recognized that, once cue register #31 has been processed, that is, the data stored therein has been used to determine the final "letter" LED register representing the quantity of tape which has been consumed, no other cue registers remain to be checked. Thus, continuing with the flow chart shown in FIG. 5, after the next cue register is selected, and after the chopper counter is incremented, the inquiry of whether the minutes counter exceeds "31.9" is answered in the negative (it has been assumed that the final count of the minutes counter is "23.X"), the minutes counter is incremented in the linearized manner, and the inquiry as to whether there are additional cue registers to be checked now is answered in the negative. The microprocessor then advances to the flow chart shown in FIG. 6.

From the foregoing detailed description, it is appreciated that, during the scan operation, the "letter" and "instruction" LED registers, from registers #31 downward, are used to temporarily store the detected "letter" and "instruction" signals reproduced from the tape. The cue registers associated with these LED registers store the chopper counts corresponding to the locations along the tape at which such signals were detected. Then, after the tape has been fully rewound, the respective "letter" and "instruction" signals are shifted, individually, from their temporary "letter" and "instruction" LED registers to the proper final storage locations. These final storage locations represent the approximate locations along the length of tape at which the "letter" and "instruction" signals were recorded. Furthermore, the individual shifting of these "letter" and "instruction" signals from their temporary storage locations to their final storage locations is indicated by the apparent shifting of the appropriate LED's.

In the foregoing example, the shifting of each "letter" or "instruction" signal from its temporary storage location to its final storage location is indicated by a corresponding selective energization of the "letter" and "instruction" indicating elements $25_L$ and $25_I$. That is, each energized element appears to be shifted in the right-to-left direction until it arrives at the proper, final location. If desired, this shifting of the "letter" and "instruction"

signals may be carried out at relatively high speeds without a concurrent display thereof. Also, if desired, each detected "letter" and "instruction" signal need not be indicated by the temporary energization of elements $25_L$ and $25_I$. Rather, display 24 can be blanked during the scan operation and may be energized only upon the completion of that operation and the completion of the shifting of the "letter" and "instruction" signals to their proper, final storage locations.

From the flow chart shown in FIG. 5, it is seen that, each time that the chopper pulse counter is incremented, inquiry is made as to whether the count of the minutes counter is in excess of "31.9". If dictation has been recorded on a tape having a maximum recording capacity of thirty minutes, this inquiry always is answered in the negative. However, if dictation is recorded on a tape having a greater recording capacity, this inquiry may be answered in the negative. If so, the step of incrementing the minutes counter in a linearized manner is omitted whenever the minutes counter has been incremented to a count that exceeds "31.9". The minutes counter is limited in this manner due to the fact that there are only thirty-two "letter" indicating elements included in display 24.

Following the completion of the scan operation, it is appreciated that the subroutine depicted in FIG. 5 continues to be recycled until cue register #31 is processed. Then, after the "letter" and "instruction" elements have been suitably energized to depict the relative locations of the recording of "letter" and "instruction" signals on the tape, the microprocessor advances to the subroutine illustrated by the flow chart shown in FIG. 6.

Figure 6:
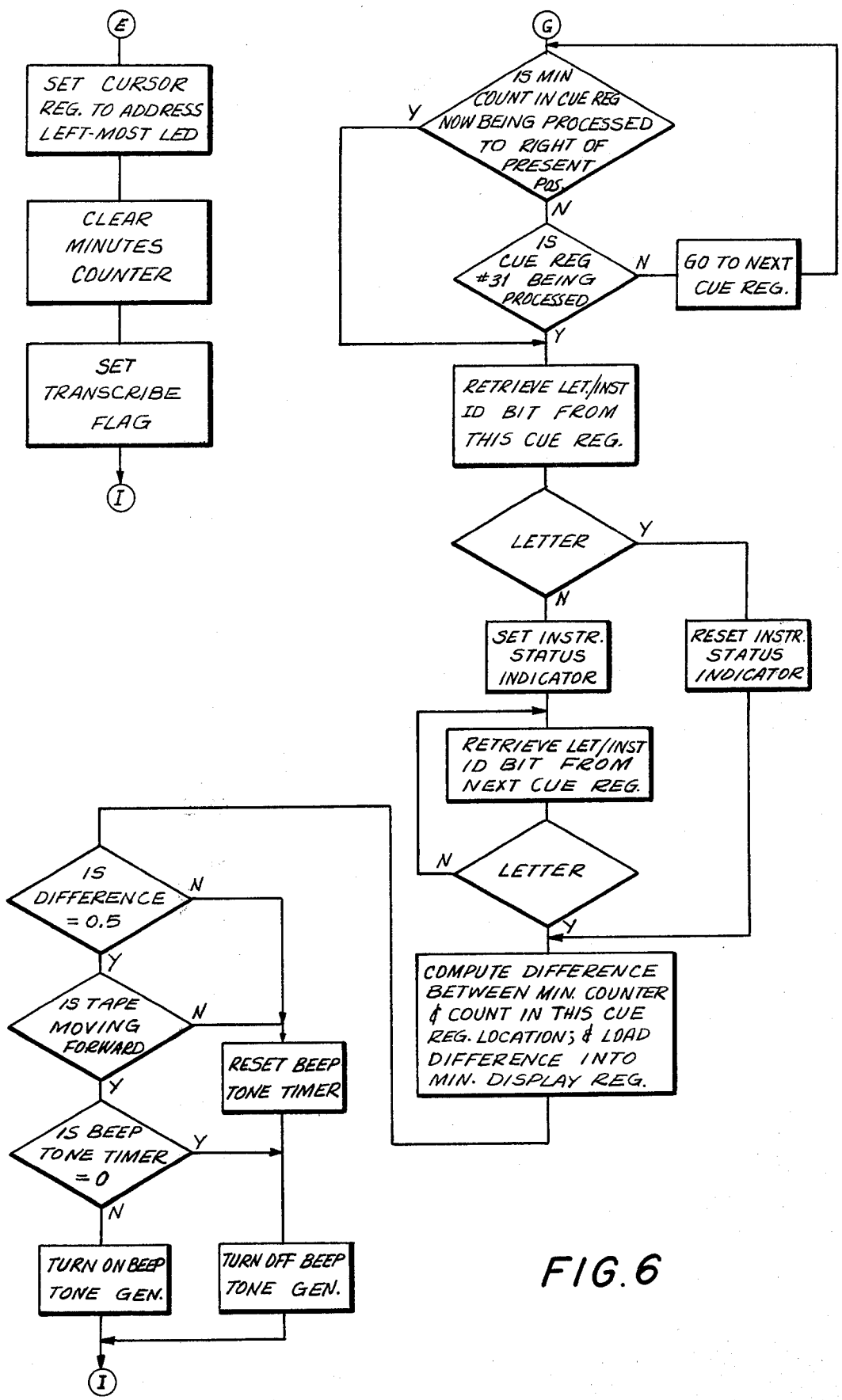
FIG. 6 is a flow chart of the display carried out during a transcribe operation.

Initially, as shown in FIG. 6, the cursor register is set so as to address the left-most "letter" LED. That is, the cursor register is set to the count [00000]. Then, the minutes counter is cleared and the "transcribe" flag is set. Machine 10 now is disposed in its transcribe mode of operation.

As indicated in the flow chart of FIG. 6, the microprocessor now advances to the hold subroutine represented by the flow chart of FIG. 2. Assuming that HOLD switch 29 is not activated and machine 10 is not disposed in its hold mode, the microprocessor advances to the flow chart of FIG. 3, whereat the inquiry of whether the "scan disable" flag is set is answered in the affirmative. Accordingly, the microprocessor advances to the subroutine shown in FIG. 7, which has been described above with respect to the dictation mode of operation. It is recalled that, in accordance with this subroutine, the minutes counter is incremented or decremented as a function of whether the tape is driven in the forward or reverse direction, respectively. The same incrementing or decrementing of the minutes counter obtains during the transcribe mode of operation, now carried out by machine 10. At the completion of this subroutine, the inquiry of whether the "transcribe" flag is set is answered in the affirmative, and the microprocessor advances to the subroutine shown in FIG. 6.

The first cue register having data therein is selected; and the identification bit stored in stage 116a of that register is retrieved. Consistent with the preceding example, it is recalled that the first cue register having data therein is cue register #29. The identification bit stored in cue register #29 is a binary "1" and the minutes count stored therein represents LED #2, thus representing that "instruction" LED $25_{I02}$ is energized to indicate the location of a recorded "instruction" signal.

Inquiry then is made as to whether the minutes count stored in this cue register is greater than the count of the cursor register, the latter representing the present position of the tape. In the present example, this inquiry is answered in the affirmative. Accordingly, the identification bit is retrieved from this cue register #29, and inquiry is made as to whether the retrieved identification bit represents a "letter" signal. From FIG. 13C, it is seen that this inquiry is answered in the negative; whereupon an instruction status indicator is set. This has the effect of energizing a suitable element (not shown) to apprise the transcriptionist that, in the dictated message now being transcribed, an instruction message has been recorded. Then, the identification bit stored in the next cue register (e.g. cue register #30) is retrieved and examined to determine if it represents a "letter" signal. If not, the foregoing operation is repeated until a "letter" identification bit is retrieved. It is appreciated that cue register #30 has a binary "0" identification bit stored therein; so that the inquiry of whether this identification bit represents a "letter" signal now is answered in the affirmative.

In accordance with the next instruction of the flow chart shown in FIG. 6, the difference between the instantaneous count of the minutes counter and the minutes count stored in this cue register (that is, the minutes count stored in cue register #30), is computed; and this difference is loaded into the minutes display register. Consistent with the example under discussion, the count now present in the minutes counter is "00.0", the reset count. Furthermore, the minutes count stored in cue register #30 is "14.X". The difference therebetween, which is equal to "14.X" is loaded into the minutes display register. Hence, minutes display 26 displays this difference. That is, minutes display 26 displays a numerical indication of the length of tape, in terms of time, remaining until the next-recorded "letter" signal is reached. It is recognized that the length of tape remaining until the next-recorded "instruction" signal is reached preferably is not indicated.

This operation is represented by the block diagram shown in FIG. 12. The appropriate cue register is selected by a selector switch 140, schematically illustrated in FIG. 12. The minutes count stored in the selected cue register is supplied to a subtractor, from which the count now present in minutes counter 128 is subtracted. The difference therebetween is supplied to minutes display register 134 by an AND circuit 138. This AND circuit is enabled by the "transcribe" flag.

After the minutes display register has been loaded with a count representing the time remaining until the "letter" signal is reached, inquiry is made as to whether this remaining time is equal to "00.5" minutes. If this inquiry is answered in the affirmative, inquiry then is made as to whether the tape is moving in the forward direction. If so, inquiry then is made as to whether a so-called beep tone timer has reached a count of zero. If not, a beep tone generator is activated, or turned on. Thus, a warning tone is generated when the tape has been transported in the forward direction to a point such that 0.5 minutes remains until the "letter" signal is reached. The microprocessor then returns to the hold subroutine, discussed above with respect to the flow chart shown in FIG. 2.

It will be appreciated that the microprocessor advances through the subroutines shown in FIGS. 2, 3 and 7, as described above, and periodically carries out the subroutine illustrated in FIG. 6, when machine 10 is disposed in the transcribe mode. If the beep tone generator had been turned on, the beep tone timer is preset to a predetermined count and then is decremented periodically. Hence, when cycling through the subroutine shown in FIG. 6, the inquiry of whether the beep tone timer is equal to zero will be answered in the negative until this timer ultimately times out. At that time, this inquiry will be answered in the affirmative and the beep tone generator will be deactivated, or turned off. As an example, the beep tone timer may exhibit a time delay, or a time-out interval, equal to 0.5 seconds.

Furthermore, after the beep tone generator has been turned on, if the tape is reversed or stopped, the inquiry of whether the tape is moving in the forward direction will be answered in the negative. Consequently, the beep tone timer then will be reset to a count of zero, even if this timer had not yet timed out. Then, the beep tone generator will be turned off.

Of course, if more than 0.5 minutes remains from the present position of the tape (as represented by the count in the minutes counter) until the "letter" signal is reached (as represented by the count in the cue register being processed), the beep tone timer will be reset and the beep tone generator will be turned off. This means that the warning tone will not be triggered. Likewise, once the beep tone generator has been triggered and the beep tone timer has cycled through its time-out interval, or has been reset, if the tape continues to be advanced such that less than 0.5 minutes remains until the "letter" signal is reached, the beep tone timer will be reset and the beep tone generator will be turned off.

It is clear that, after the beep tone generator has been triggered, or deactivated, the microprocessor advances to the hold subroutine shown in FIG. 2. After this subroutine is carried out, in the manner discussed above, the microprocessor advances to the first inquiry shown in FIG. 3, that is, whether the "scan disable" flag is set. This inquiry is answered in the affirmative; and the microprocessor advances to the subroutine shown in FIG. 7. This subroutine has been described above and, as is recalled, as the tape is advanced to transcribe the information recorded thereon, chopper pulses are counted, the prescaler is incremented, and the minutes counter is incremented in a linearized manner. Of course, if the tape is driven in the reverse direction, then the prescaler and minutes counter both are decremented, as discussed above. Furthermore, as the minutes counter is incremented or decremented, the cursor register is set to the minutes count displayed in the former; and a corresponding one of the "letter" elements $25_L$ is energized to provide the appropriate cursor indication of the present position of the tape. After the cursor register has been set to the minutes count, the inquiry of whether the "transcribe" flag is set is answered in the affirmative. The microprocessor then advances to cycle once again through the subroutine illustrated in FIG. 6.

Thus, as the tape continues to advance, the difference between the present position thereof, as represented by the count of the minutes counter, and the location of the next "letter" signal on the tape, as represented by the count stored in the next cue register having a "letter" identification bit stored therein, is computed, and this difference is loaded into the minutes display register. Accordingly, minutes display register 26 continues to display the time remaining until the "letter" signal is reached. This apprises the operator of machine 10 of the time remaining until the end-of-letter is attained. When this remaining time is equal to 0.5 minutes, the beep tone generator is triggered for a predetermined time so as to provide a suitable warning of the approach of the end of letter.

It is appreciated that the microprocessor cycles through the subroutine illustrated in FIG. 6, then advances to the hold subroutine shown in FIG. 2, and then proceeds to update the minutes counter in accordance with the subroutine shown in FIG. 7, then to return to FIG. 6. If, during this cycling through the various subroutines, HOLD switch 29 is activated, the hold routine, discussed above with respect to FIG. 2, is carried out. When HOLD switch 29 is re-activated, the microprocessor exits from the hold routine and continues to cycle in the aforedescribed manner.

In the example presently described, the "letter" identification bit is stored in cue register #30. Also stored in this cue register is the minutes count "14.X". When the minutes counter has been incremented so as to be equal to this count of "14.X", the end of letter is reached. Then, and in accordance with the flow chart shown in FIG. 6, when the minutes counter is incremented, the inquiry of whether the minutes count in the cue register now being processed (i.e. cue register #30) is to the right of (i.e. greater than) the present position of the tape (as represented by the count in the minutes counter) is answered in the negative. Accordingly, inquiry now is made as to whether cue register #31 is being processed. Since it is cue register #30 that is being examined, this inquiry is answered in the negative, so that the next cue register (which now is cue register #31) is selected for processing.

Since the minutes count stored in cue register #31 ("23.X") is greater than the present count of the minutes counter, the inquiry of whether the minutes count in the cue register being processed is to the right of the present position of the tape is answered in the affirmative. The identification bit then is retrieved from this cue register and, inasmuch as it represents a "letter" signal, the instruction status indicator is reset. Then, the difference between the count "23.X" stored in cue register #31 and the present count "14.X" of the minutes counter is computed; and this difference is loaded into the display register which, in turn, drives minutes display 26 so as to display the time remaining between the present position of the tape and the occurrence of this next "letter" signal. The microprocessor then continues to cycle through the subroutine illustrated in FIG. 6; it advances to the hold subroutine shown in FIG. 2; then to that of FIG. 3; and then to the subroutine illustrated in FIG. 7, returning to the subroutine of FIG. 6, all in the aforedescribed manner.

With respect to the block diagram shown in FIG. 12, after minutes counter 128 has been advanced to by 0.1 minutes beyond the count "14.X" and, thus, is 0.1 minutes greater than the count stored in cue register #30, selector switch 140 advances to the next cue register, that is, to cue register #31. Subtractor 136 then subtracts the instantaneous count of minutes counter 128 from the count stored in cue register #31; this difference being supplied via AND circuit 138 to minutes display register 134.

The foregoing has described the operation of the microprocessor which controls displays 24 and 26 in various modes of operation. In particular, the standby mode has been described, with reference to FIG. 2. Also, the hold mode of operation has been described, and it is appreciated that, when HOLD switch 29 is activated, displays 24 and 26 remain latched so that the cassette which presently is being processed in machine 10 can be replaced by another cassette without disturbing the displays which have been derived from the replaced cassette.

From the hold mode shown in FIG. 2, the microprocessor advances to carry out a dictate subroutine, discussed with respect to FIGS. 7 and 8, or to carry out a scan subroutine, discussed with respect to FIGS. 3, 4 and 5, or to carry out the transcribe subroutine, discussed with respect to FIGS. 6 and 7. Thus, in the dictate mode, elements $25_L$ are selectively energized to provide both a cursor indication and an indication of the location of "letter" signals which are recorded on the tape. Elements $25_I$ likewise are selectively energized to display the relative locations of "instruction" signals. Minutes display 26 is driven to display the quantity of tape which has been consumed, in terms of minutes and tenths of minutes, during this dictate mode. In the scan mode, tape is rewound from an arbitrary position back to the beginning thereof; and as each cue signal is detected during this operation, successive ones of elements $25_{L31}$, $25_{L30}$, $25_{L29}$, . . . or elements $25_{I30}$, $25_{I29}$, . . . are energized to indicate the detection of successive cue signals. When the tape reaches its beginning, the particularly energized elements are shifted from right-to-left from their temporary locations to final locations representing the positions along the tape at which "letter" and "instruction" signals are recorded. Also, at the completion of the scan operation, minutes display 26 displays the time remaining from the beginning of the tape to the location of the first "letter" signal. Then, during a transcribe mode, elements $25_L$ are selectively energized to provide cursor indications as the tape is driven; and minutes display 26 is decremented to display the time remaining between the present position of the tape and the location of the next "letter" signal. Thus, display 26 provides a display, in terms of time, from the present position of the tape to the end of the letter then being transcribed.

While the present invention has been particularly shown and described with reference to preferred embodiments, various changes and modifications in form and details may be made without departing from the spirit and scope of the invention. Preferably, displays 24 and 26 are controlled by the microprocessor having the various subroutines discussed above. Alternatively, the microprocessor may be replaced by discrete circuitry having the construction described broadly in the block diagrams of FIGS. 9, 12 and 14. Furthermore, although the record medium with which the present invention can be used has been described as being a magnetic tape, it should be appreciated that other media, such as a magnetic belt, sheet, disc or the like may be employed. Also, while the arrays of "letter" and "instruction" elements $25_L$ and $25_I$ have been described as being comprised of thirty-two elements, a greater or smaller number of elements may be used, as desired. For example, if machine 10 is to be used primarily with a record medium having a recording capacity of 45 minutes, then 47 elements may be employed to represent each element of recording time 0, 1, . . . 45, 45+. Additionally, it is understood that elements $25_L$ and $25_I$ may be light sources, such as LED's, incandescent lamps, and the like, or may be light reflective, such as LCD's, or may be other electrically energized visual indicating elements.

It is intended that the appended claims be interpreted as including the foregoing as well as various other changes and modifications.

What is claimed is:

1. In a signal recording/playback device wherein signal information is recorded on and/or played back from a movable record medium, apparatus for displaying a numerical representation of the relative amount of information which has been recorded, comprising numerical display means for displaying a numerical representation of time; detecting means for detecting the movement of an incremental amount of said record medium either in a first or a second direction and for generating a motion pulse indicative thereof, the rate at which said motion pulses are generated varying as a function of the amount of said record medium which has been moved; linearizing means responsive to said generated motion pulses for producing count pulses representing the movement of substantially equal, predetermined incremental amounts of said record medium; counting means for counting said count pulses in a first counting direction when said record medium is moved in said first direction and for counting said count pulses in a second counting direction when said record medium is moved in said second direction to accumulate a count representing time duration; and means for selectively energizing said numerical display means with said count.

2. The apparatus of claim 1 further comprising cursor display means for displaying a cursor indication of the present relative position of said record medium; decoding means for decoding at least a preselected portion of said count; and means for energizing said cursor display means in accordance with the decoded count.

3. The apparatus of claim 2 wherein said cursor display means comprises a linear array of substantially equally spaced light indicating elements, a respective element being energized when the count of said counting means represents a corresponding preselected time duration.

4. The apparatus of claim 3 further comprising cue signal sensing means for sensing the recording and/or playback of a cue signal on said record medium; and means for selectively energizing the respective light indicating element which corresponds to the count of said counting means when said cue signal is sensed to display a cue indication.

5. The apparatus of claim 4 wherein said signal recording/playback device is operable to transcribe signal information recorded on said record medium; and further comprising means for selectively energizing said numerical display means to display a numerical representation of time remaining between said cursor indication of present position and a predetermined cue indication.

6. The apparatus of claim 5 further comprising warning means for providing a warning when said numerical representation is equal to a predetermined time duration.

7. The apparatus of claim 3 further comprising "letter" and "instruction" signal sensing means for sensing the recording and/or playback of a "letter" or "instruction" signal on said record medium; and wherein said linear array comprises arrays of substantially equally spaced "letter" and "instruction" light indicating elements, a respective "letter" element being energized as said cursor indication; and further comprising means for selectively energizing the respective "letter" element which corresponds to the count of said counting means when said "letter" signal is sensed to display the relative location of a "letter" indication and means for selectively energizing the respective "instruction" element which corresponds to the count of said counting means when said "instruction" signal is sensed to display the relative location of an "instruction" indication.

8. The apparatus of claim 4 further comprising selectively operable scan means for scanning said record medium from an arbitrary location thereon back to the beginning of said medium, said cue signal sensing means being operative during the scanning of said record medium for sensing the playback of a cue signal; temporary storage means for temporarily storing a representation of each sensed cue signal; means for energizing selected ones of said light indicating elements to indicate the temporarily stored representations; final storage locations corresponding to discrete relative locations along said record medium; means responsive to the return of said record medium to the beginning thereof to transfer each temporarily stored representation to a respective final storage location; and means for energizing said light indicating elements to display the individual shifting of indications sequentially from one element to the next until said individual indication reaches an element associated with said respective final storage location, thereby to display the approximate relative locations of cue signals on said record medium.

9. The apparatus of claim 8 further comprising means responsive to the operation of said scan means for energizing said numerical display to provide a predetermined alphanumeric indication.

10. The apparatus of claim 4 further comprising selectively operable inhibit means for inhibiting any change in said numerical display or said linear array display even if said record medium moves, thereby to enable said recording/playback device to operate temporarily with another record medium without disturbing the displayed information derived from the record medium with which said device previously operated.

11. The apparatus of claim 4 further comprising means responsive to a fault condition for flashing said numerical display means and said light indicating elements; and clear means selectively operable to reset said numerical display means to a predetermined numerical display and to blank successive ones of said light indicating elements in sequence.

12. In a signal playback device wherein signal information is played back from a movable record medium, apparatus for scanning said record medium to detect and display the relative locations of cue signals recorded thereon, said apparatus comprising means for driving said record medium in a reverse direction from an arbitrary position thereon back to the beginning thereof; sense means for sensing each cue signal recorded on said record medium as said medium is driven; a linear array of light indicating elements; means for energizing successive ones of said light indicating elements, commencing with a predetermined element, in response to sensing successive cue signals, irrespective of the actual locations of said cue signals recorded on said record medium, as said record medium is driven; and means responsive to the stopping of said record medium to shift the energization of the successive light indicating elements individually and sequentially from the elements which were energized immediately prior to the stopping of the record medium to the particular elements which provide indications of the approximate locations of corresponding cue signals along said record medium.

13. The apparatus of claim 12 wherein said predetermined light indicating element represents the position of farthest advance of said record medium.

14. The apparatus of claim 13 wherein said predetermined light indicating element is the right-most element in said array.

15. The apparatus of claim 14 wherein successive, adjacent light emitting elements are energized in right-to-left manner in response to sensing successive cue signals as said record medium is driven.

16. The apparatus of claim 12, further comprising motion pulse generating means for generating motion pulses as said record medium is driven; motion pulse counting means for counting said motion pulses; storage means having a plurality of storage locations each selectable to temporarily store the count then present in said motion pulse counting means at the time a cue signal is sensed; storage location selecting means for selecting the next storage location to temporarily store a count; means for converting each temporarily stored count to an address count when said record medium is stopped, said address count identifying the correct light indicating element which indicates the approximate location of said sensed cue signal along said record medium; and means for energizing the identified light indicating element.

17. The apparatus of claim 16 wherein said means for converting comprises address counting means normally reset to an initial address count when said record medium is stopped; means for incrementing said address counting means in synchronism with said motion pulse counting means after said record medium has stopped so as to identify corresponding light indicating elements; comparator means for comparing the instantaneous motion pulse count in said motion pulse counting means with the motion pulse count temporarily stored in the last-selected storage location until said motion pulse counts are equal; means for sequentially shifting the energized light indicating element from the element which had been energized immediately prior to the stopping of the record medium to the element identified by the count then present in said address counting means; and means for selecting the next storage location whose temporarily stored motion pulse count is supplied to said comparator means.

18. The apparatus of claim 17 wherein said means for sequentially shifting comprises means for energizing successive light indicating elements until the element identified by the count then present in said address counting means is energized.

19. The apparatus of claim 18 wherein the cue signals recorded on said record medium selectively represent either a "letter" indicating signal or an "instruction" indicating signal; wherein said linear array of light indicating elements comprises an array of "letter" indicating elements and a parallel array of "instruction" indicating elements; wherein each selected storage location temporarily stores a "letter" or "instruction" indicating signal, respectively; wherein said means for energizing successive ones of said light indicating elements, commencing with a predetermined element, in response to sensing successive cue signals energizes successive "letter" or "instruction" elements in accordance with the sensing of a "letter" or "instruction" indicating signal, respectively; and wherein said means for sequentially shifting the energized light indicating element comprises "letter" and "instruction" registers having storage locations associated with respective ones of said "letter" and "instruction" elements for temporarily storing "letter" and "instruction" signals in accordance with the sensed cue signals, means for shifting the "letter" or "instruction" signal temporarily stored in a corresponding register storage location to successive register storage locations until the register storage location associated with the element identified by the count then present in said address counting means is reached.

20. The apparatus of claim 17 further comprising means for storing in the selected storage locations the converted counts of said address counting means; means for resetting the count in said address means after the last storage location having a temporarily stored motion pulse count has been selected; means for incrementing the count of said address counting means in synchronism with the subsequent movement of said record medium; means for selecting the next storage location having a count therein which exceeds the instantaneous count of said address counting means; means for calculating the difference between the count stored in the selected storage location and said instantaneous count of said address counting means; numeral display means; and means for energizing said numeral display means to display said calculated difference.

21. The apparatus of claim 20 further comprising means for selectively energizing said numeral display means when said scan means is operated to provide a distinctive display.

22. In a signal playback device wherein signal information is played back from a movable record medium, display apparatus comprising a linear array of substantially equally spaced light indicating elements; storage means having a plurality of selectable storage locations for storing counts therein representing the relative locations along said record medium of recorded cue signals; energizing means for energizing those light elements corresponding to the counts stored in said storage locations; counting means incremented in synchronism with the movement of said record medium to provide an instantaneous count representing the present position of said record medium; actuating means for actuating the one light element corresponding to said instantaneous count to display a cursor indication of said present position of said record medium; means for selecting the next storage location having a count therein which exceeds said instantaneous count; means for calculating the difference between the count stored in said selected storage location and said instantaneous count; numerical display means; and means for energizing said numerical display means to display said difference.

23. The apparatus of claim 22, further comprising means for detecting when said difference is equal to a predetermined amount; and warning means responsive to said detecting means for providing a warning indication.

24. In a signal recording/playback device wherein signal information is recorded on and/or played back from a movable record medium, display apparatus comprising motion pulse generating means for generating motion pulses in synchronism with the movement of said record medium; counting means for counting said motion pulses to provide a count representing a time-related quantity of record medium that has been moved relative to a reference position; a linear array of light indicating elements, each element being associated with a respective time-related quantity; energizing means responsive to the count of said counting means for energizing a corresponding light indicating element to provide a cursor indication of the present relative position of said record medium; cue signal sensing means for sensing the recording and/or playback of a cue signal on said record medium; and means for energizing those light indicating elements corresponding to respective instantaneous counts of said counting means when cue signals are sensed to display cue indications of the relative locations of cue signals recorded on said record medium.

25. The apparatus of claim 24, further comprising register means having a plurality of register storage locations associated with said light indicating elements, respectively; address means for addressing a respective one of said register storage locations with the instantaneous count of said counting means; and means for loading an energizing signal into the addressed register storage location if a cue signal is sensed.

26. The apparatus of claim 24 wherein said counting means comprises programmable divider means for dividing the number of generated motion pulses by a programmable ratio; minutes counting means coupled to and incremented by said programmable divider means, said minutes counting means including a fraction of minutes stage whose count represents a fraction of minutes and a minutes stage whose count represents minutes; means for sensing when the count of at least said minutes stage is equal to preselected minute quantities; and means for changing the dividing ratio of said programmable divider means to preselected ratios when the count of at least said minutes stage becomes equal to corresponding ones of said preselected minute quantities.

27. The apparatus of claim 26 further comprising numerical display means for displaying the fraction of minutes and minutes counts of said minutes counting means.

28. The apparatus of claim 26 wherein each light indicating element is associated with a respective minutes count, and the light indicating element associated with the minutes count then present in said minutes stage is energized to provide said cursor indication, and the light indicating elements associated with the minutes counts of said minutes stage at the time said cue signals are sensed are energized to display said cue indications.

29. The apparatus of claim 24, further comprising means for flashing all of said light indicating elements to indicate the occurrence of a preselected condition; and reset means selectively operable to preset said counting means to a predetermined count, and to alternately extinguish the light indicating element associated with the time-related quantity represented by said count and decrement said count.

30. A method of displaying a numerical representation; of the relative amount of information which has been recorded on a movable record medium, comprising the steps of detecting the movement of an incremental amount of said record medium either in a first or a second direction and generating a motion pulse indicative thereof at a rate which varies as a function of the amount of said record medium which has been moved; producing count pulses in response to said motion pulses representing the movement of substantially equal, predetermined incremental amounts of said record medium; counting said count pulses in a first counting direction when said record medium is moved in said first direction and in a second counting direction when said record medium is moved in said second direction to accumulate a count representing time duration; and displaying a numerical representation of said count.

31. A method of scanning a movable record medium to detect and display the relative locations of cue signals recorded thereon, comprising the steps of driving said record medium in a reverse direction from an arbitrary position thereon back to the beginning thereof; sensing each cue signal recorded on said record medium as said medium is driven; energizing successive ones of a linear array of light indicating elements, commencing with a predetermined element, in response to sensing successive cue signals, irrespective of the actual locations of said cue signals recorded on said record medium, as said record medium is driven; detecting the stopping of said record medium; and shifting the energization of the successive light indicating elements individually and sequentially from the elements which were energized immediately prior to the stopping of the record medium to the particular elements which provide indications of the approximate locations of corresponding cue signals along said record medium.

32. A method of displaying the amount of movable record medium which remains between the present position thereof and a cue signal recorded thereon, comprising the steps of storing a count in one of a plurality of storage locations, the stored count representing the relative location along said record medium of said recorded cue signal; energizing those light elements determined by the counts stored in said storage locations; counting in synchronism with the movement of said record medium to provide an instantaneous count representing the present position of said record medium; actuating the one light element corresponding to said instantaneous count to display a cursor indication of said present position of said record medium; selecting the next storage location having a count therein which exceeds said instantaneous count; calculating the difference between the count stored in said selected storage location and said instantaneous count; and displaying a numerical representation of said difference.

33. A method of displaying the present position of a movable record medium and also the locations of cue signals recorded on said record medium, comprising the steps of generating motion pulses in synchronism with the movement of said record medium; counting said motion pulses to provide a count representing a time-related quantity of record medium that has been moved relative to a reference position; energizing a corresponding one of a linear array of light indicating element in accordance with said count to provide a cursor indication of the present relative position of said record medium; sensing the recording and/or playback of a cue signal on said record medium; and energizing those light indicating elements corresponding to respective instantaneous counts when cue signals are sensed to display cue indications of the relative locations of cue signals recorded on said record medium.

34. In a signal recording device wherein signal information is recorded on a movable record medium, display apparatus comprising numerical time display means for displaying a numerical representation of time in terms of minutes and fractions of minutes; detecting means for detecting the movement of said record medium in forward and reverse directions and for generating pulses in response to said movement, the rate at which said pulses are generated varying as a function of the amount of said record medium which has been moved; linearizing means coupled to receive said pulses for producing count pulses representing the movement of substantially equal, predetermined incremental amounts of said record medium; count means responsive to the count pulses produced by said linearizing means for providing a count representing the time duration that signal information has been recorded on said record medium, commencing from a beginning portion thereof; energizing means for energizing said numerical time display means to display said count in terms of minutes and fractions of minutes; cue signal recording means for selectively recording cue signals on said record medium; and cue signal display means for displaying indications of the recorded cue signals.

35. The apparatus of claim 34 wherein said cue signal display means displays the quantity of cue signals recorded on said record medium.

36. The apparatus of claim 35 wherein said cue signal display means includes a linear array of substantially equally spaced light indicating elements, a respective element being energized when a cue signal is recorded, the energized element corresponding to the count of said count means.

37. The apparatus of claim 35 wherein said cue signals are "instruction" signals.

38. The apparatus of claim 35 wherein said cue signals are "letter" signals.

39. In a signal transcribe device wherein dictation in the form of dictated information is transcribed and cue signals are played back from a movable record medium, display apparatus comprising numerical time display means operative when dictated information is transcribed from said record medium for displaying a numerical representation of time in terms of minutes and fractions of minutes; detecting means for detecting the movement of said record medium in forward and reverse directions and for generating pulses in response to said movement, the rate at which said pulses are generated varying as a function of the amount of said record medium which has been moved; linearizing means coupled to receive said pulses for producing count pulses representing the movement of substantially equal, predetermined incremental amounts of said record medium; count means responsive to the count pulses produced by said linearizing means for providing a count representing the time duration that dictated information has been transcribed from said record medium, commencing from a predetermined portion thereof; energizing means responsive to said count for energizing said numerical time display means to display in terms of minutes and fractions of minutes the amount of dictation awaiting transcription; scan means for scanning said record medium from an arbitrary location thereon back to said predetermined portion of said medium; cue signal sensing means operative during the scanning of said record medium for sensing the playback of a cue signal; storage means for storing a representation of each sensed cue signal; and cue signal display means for displaying indications of the sensed cue signals.

40. The apparatus of claim 39 wherein said cue signal display means displays the quantity of cue signals sensed from said record medium.

41. The apparatus of claim 40 wherein said cue signal display means includes a linear array of substantially equally spaced light indicating elements, successive ones of said light indicating elements being energized during the scanning of said record medium in response to the successive sensing of cue signals, the number of light indicating elements that are energized being an indication of the number of cue signals that have been sensed.

42. The apparatus of claim 40 wherein said cue signals are "instruction" signals.

43. The apparatus of claim 40 wherein said cue signals are "letter" signals.

44. The apparatus of claim 43 further comprising location means for providing location signals representing the respective locations on said record medium at which each "letter" signal is recorded; means operative when dictated information is transcribed from said record medium for comparing the count provided by said count means to a respective location signal to determine the difference therebetween; and means for supplying a signal representing said difference to said energizing means.

45. In a signal playback device wherein signal information is played back from a movable record medium, display apparatus comprising numerical display means for displaying a numerical representation of time in terms of minutes and fractions of minutes; storage means having a plurality of selectable storage locations for storing counts therein representing the relative locations along said record medium of recorded cue signals; counting means incremented in synchronism with the movement of said record medium to provide an instantaneous count representing the present position of said record medium; means for selecting the next storage location of said storage means having a count therein which exceeds said instantaneous count; means for calculating the difference between the count stored in said selected storage location and said instantaneous count; and means for energizing said numerical display means to display said difference.

46. The apparatus of claim 45 wherein said recorded cue signals selectively include "letter" and "instruction" signals; said storage means store "letter" and "instruction" signals in said storage locations to identify whether "letter" or "instruction" signals are recorded on said record medium; and said means for selecting selects the next storage location having a "letter" signal therein.

47. The apparatus of claim 46 further comprising means for indicating the presence of an "instruction" signal recorded on said record medium between the recording of two "letter" signals.

* * * * *